United States Patent
Perry

(10) Patent No.: US 11,170,434 B1
(45) Date of Patent: Nov. 9, 2021

(54) SYSTEMS AND METHODS FOR EMULATING A FUEL PUMP AND MARKETING ON A MOBILE DEVICE

(71) Applicant: Excentus Corporation, Dallas, TX (US)

(72) Inventor: Dickson Perry, Dallas, TX (US)

(73) Assignee: Excentus Corporation, Dallas, TX (US)

( * ) Notice: Subject to any disclaimer, the term of this patent is extended or adjusted under 35 U.S.C. 154(b) by 993 days.

(21) Appl. No.: 14/306,140

(22) Filed: Jun. 16, 2014

(51) Int. Cl.
*G06Q 30/00* (2012.01)
*G06Q 50/00* (2012.01)
*G06Q 30/06* (2012.01)
*G06Q 30/02* (2012.01)
*G06Q 50/06* (2012.01)

(52) U.S. Cl.
CPC ..... *G06Q 30/0641* (2013.01); *G06Q 30/0267* (2013.01); *G06Q 50/06* (2013.01)

(58) Field of Classification Search
USPC ........................................................ 705/7.32
See application file for complete search history.

(56) References Cited

U.S. PATENT DOCUMENTS

| | | | |
|---|---|---|---|
| 7,155,199 B2 | 12/2006 | Zalewski et al. | |
| 7,487,112 B2 | 2/2009 | Barnes, Jr. | |
| 7,822,688 B2 | 10/2010 | Labrou et al. | |
| 7,917,439 B2 | 3/2011 | Barnes, Jr. | |
| 8,484,086 B2 | 7/2013 | Pavlic et al. | |
| 8,566,168 B1 | 10/2013 | Bierbaum et al. | |
| 8,611,919 B2 | 12/2013 | Barnes, Jr. | |
| 9,384,162 B2 | 7/2016 | Tsai et al. | |
| 2007/0276763 A1 | 11/2007 | Kleinman et al. | |
| 2009/0294526 A1 | 12/2009 | Maw | |
| 2010/0082444 A1 | 4/2010 | Lin et al. | |
| 2011/0022515 A1 | 1/2011 | Tallitsch et al. | |
| 2011/0112898 A1 | 5/2011 | White | |
| 2012/0271725 A1 | 10/2012 | Cheng | |
| 2012/0278727 A1* | 11/2012 | Ananthakrishnan | H04L 29/08576 715/748 |
| 2012/0317628 A1 | 12/2012 | Yeager | |
| 2013/0024371 A1* | 1/2013 | Hariramani | G06Q 20/384 705/41 |
| 2013/0098984 A1 | 4/2013 | Shenker et al. | |
| 2013/0132218 A1 | 5/2013 | Aihara et al. | |
| 2013/0246171 A1* | 9/2013 | Carapelli | G06Q 20/326 705/14.51 |

(Continued)

OTHER PUBLICATIONS

Cox et al., Transforming the Customer Experience: The Promise of Mobile Wallets, 2012, First Data Corporation (Year: 2012).*

(Continued)

*Primary Examiner* — Timothy Padot
*Assistant Examiner* — Allison M Neal
(74) *Attorney, Agent, or Firm* — Norton Rose Fulbright US LLP

(57) ABSTRACT

A method for emulating a fuel pump interface on a mobile device and for marketing on a mobile device. The user of a mobile device is presented with a user interface such that the user receives information from and interacts with the mobile device to carry out certain functions as if the user is at the fuel pump and is interacting with the fuel pump directly. The mobile device may be used to present marketing information on the mobile device.

74 Claims, 15 Drawing Sheets

(56) References Cited

U.S. PATENT DOCUMENTS

| | | |
|---|---|---|
| 2013/0275641 A1 | 10/2013 | Tsai et al. |
| 2014/0089116 A1 | 3/2014 | Argue et al. |
| 2014/0100692 A1* | 4/2014 | Chittenden, Jr. ..... G07F 15/001 700/236 |
| 2014/0316588 A1* | 10/2014 | Giera .................... F04B 49/065 700/282 |
| 2014/0351138 A1* | 11/2014 | Frieden ................ G06Q 20/325 705/44 |
| 2014/0372221 A1* | 12/2014 | Momin .............. G06Q 30/0266 705/14.63 |
| 2015/0120476 A1* | 4/2015 | Harrell ................. G07F 13/025 705/21 |
| 2015/0126109 A1 | 5/2015 | Keshavdas et al. |
| 2015/0149284 A1* | 5/2015 | Williams ........... G06Q 30/0251 705/14.56 |
| 2015/0199684 A1 | 7/2015 | Maus et al. |
| 2015/0339648 A1 | 11/2015 | Kushevsky et al. |
| 2017/0109722 A1* | 4/2017 | Morris ................ G06Q 20/145 |
| 2017/0178095 A1* | 6/2017 | Mathew ................ G06Q 20/10 |
| 2019/0272517 A1 | 9/2019 | Paulo Rodrigues |

OTHER PUBLICATIONS

Bertagnoli, L., "As gas station skimmer card fraud increases, here's how to cut your risk," https://www.creditcards.com/credit-card-news/gas-station-skimmer-fraud.php, last accessed Oct. 25, 2017, 6 pages.

* cited by examiner

SYSTEMS AND METHODS FOR EMULATING A FUEL PUMP AND MARKETING ON A MOBILE DEVICE

CROSS-REFERENCE TO RELATED APPLICATIONS

The present application is related to co-pending and commonly assigned U.S. patent application Ser. No. 14/306,144 entitled "SYSTEMS AND METHODS FOR EMULATING A POINT OF SALE ON A MOBILE DEVICE," filed Jun. 16, 2014, the disclosure of which is hereby incorporated herein by reference.

TECHNICAL FIELD

The invention relates generally to fuel transactions, and more specifically to emulating a fuel pump on a mobile device and marketing on a mobile device.

BACKGROUND OF THE INVENTION

Fuel purchase transactions are just one of many types of sales transactions that occur in today's society. But fuel purchase transactions differ, in many respects, from other types of sales transactions. For instance, unlike most other commodities, fuel (e.g. gasoline, diesel, CNG, CGH2, HCNG, LPG, LH2, ethanol fuel, biofuels like biodiesel, and kerosene) is received in a tank of a vehicle, is not usually returnable and, therefore, usually requires pre-payment or preauthorization before the consumer has access to the commodity.

Because the fuel is received in vehicles, the fuel purchase transaction usually takes place in a service station, which has the point-of-sale (fuel pump) outdoors. In this way, vehicles can pull up to a fuel pump and receive fuel from the fuel pump. The fuel pump not only pumps fuel into a vehicle but also calculates the cost of the fuel transferred to the vehicle. Though there are canopies at service stations that provide some protection from rain, essentially, the fuel purchase transactions at these service stations take place outdoors, in the elements.

Typically, the consumer is the person who operates the pump—a self-service operation. For the few areas that still have service stations that are full service, a service station attendant operates the fuel pump. Most fuel purchase transactions involve the consumer either paying at the pump or paying a service station attendant at a backcourt of the service may involve the consumer inserting a debit or credit card in a card reader at the pump; selecting a type and grade of fuel; inserting the pump nozzle in the vehicle; and pumping the fuel in the tank. The consumer may cause the fuel to be pumped in the tank by setting the nozzle so that the fuel is pumped automatically until the vehicle tank is full, at which point the nozzle automatically stops pumping. Or the consumer may operate the nozzle to manually control pumping of the fuel and to manually terminate pumping of the fuel.

A fuel purchase transaction that involves payment to the service station attendant may involve one leaving one's car to go to the back court of the service station; presenting cash, check, or other payment method to the service station attendant; selecting a type and grade of fuel; inserting the pump nozzle in the vehicle; and setting the nozzle so that fuel is pumped automatically, or operating the nozzle to manually control pumping of the fuel, as described above.

While there have been improvements in the field of fuel marketing to improve the consumer's experience with the onset of faster pumps and self-service payment using financial cards etc., improvements to the customer experience in carrying out fuel transactions are always desired.

BRIEF SUMMARY OF THE INVENTION

In arriving at the present invention, the present inventor recognized that in typical fuel transactions, paying at the pump and paying a service station attendant at the backcourt of the service station both involve unnecessarily spending a significant amount of time outside of one's vehicle. In some scenarios, this may be inconvenient. For example, the temperature may be very hot or very cold and the consumer may wish to spend as little time as possible outside the vehicle. Further, the consumer may be disabled or have some impairment that makes leaving the vehicle difficult.

Beyond convenience, there are safety and security reasons why one may not want to use the traditional methods of purchasing fuel. For instance, thieves may install skimmers at the card readers of the pump to steal card information when legitimate fuel transactions are being made with financial cards. Also, for the disabled consumer who would normally hand a financial card to a service station attendant to complete the transaction at the pump, there is a period of time in which the financial card is outside the physical control of the consumer. This could be a security concern if the service station attendant is unscrupulous. Further, leaving one's car to go to a service station's backcourt to pay for fuel exposes the car and its contents to theft or exposes the consumer to attack en route to and from the backcourt of the service station.

Embodiments of the present invention are directed to systems and methods that are adapted to emulate a service station pump on a mobile device of a user such that the user can perform at least some steps of the fuel purchasing transaction via inputs to the mobile device (e.g. inputs to a graphical user interface of the mobile device). In this way, the consumer can perform these steps wherever the mobile device is, instead of only at the fuel pump. Thus, if the consumer desires to stay in the vehicle being refueled (or stay at another location apart from at the pump) and perform these steps, the consumer can do so. The flexibility that this feature offers may result in consumer fuel transactions being safer, more convenient, and more secure than they are presently. Further, an advertiser may advertise to a user, via the mobile device, during the fueling transaction, since at that point the advertiser has a captive audience.

Embodiments of the invention include a method for carrying out a fuel transaction. The method includes obtaining, by at least one processor, emulation data regarding a fuel pump and sending, by the at least one processor, the emulation data to a mobile device of a user. The method also includes, receiving, by the at least one processor, during the fuel transaction, from the mobile device, information regarding the fuel transaction. And based on the information received from the mobile device, performing, by the at least one processor, at least one step for the fuel transaction.

Embodiments of the invention also include an apparatus for a fuel transaction. The apparatus includes a memory and at least one processor coupled to the memory. The processor is adapted to obtain emulation data of a fuel pump and send the emulation data to a mobile device of a user. The processor is also adapted to receive, from the mobile device, during the fuel transaction, information regarding the fuel transaction, and based on the information received from the mobile device, to perform at least one step for the fuel transaction.

Embodiments of the invention also involve a method that includes receiving, by at least one processor, service data for a vehicle and a location data of the vehicle and determining, by the at least one processor, based on the service data and the location data, an advertisement to present to a user via a mobile device.

Embodiments of the invention include, a mobile device including a memory, and a processor coupled to the memory. The processor may be configured to receive service data for a vehicle and a location data of the vehicle, and to determine, based on the service data and the location data, an advertisement to present to a user, via the mobile device.

Embodiments of the invention are directed to a mobile device that include a display, a memory, and at least one processor. The processor is adapted to control presenting, on the display, a graphical user interface that emulates a fuel pump. The graphical user interface may be adapted such that the user is able to control operation of the fuel pump by the user interacting with the graphical user interface on the display.

Embodiments of the invention include a computer program product that includes a non-transitory computer-readable medium having program code recorded thereon. The program code includes program code to present a graphical user interface that emulates a fuel pump. The graphical user interface may be adapted such that the user is able to control operation of the fuel pump by the user interacting with the graphical user interface on the display.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
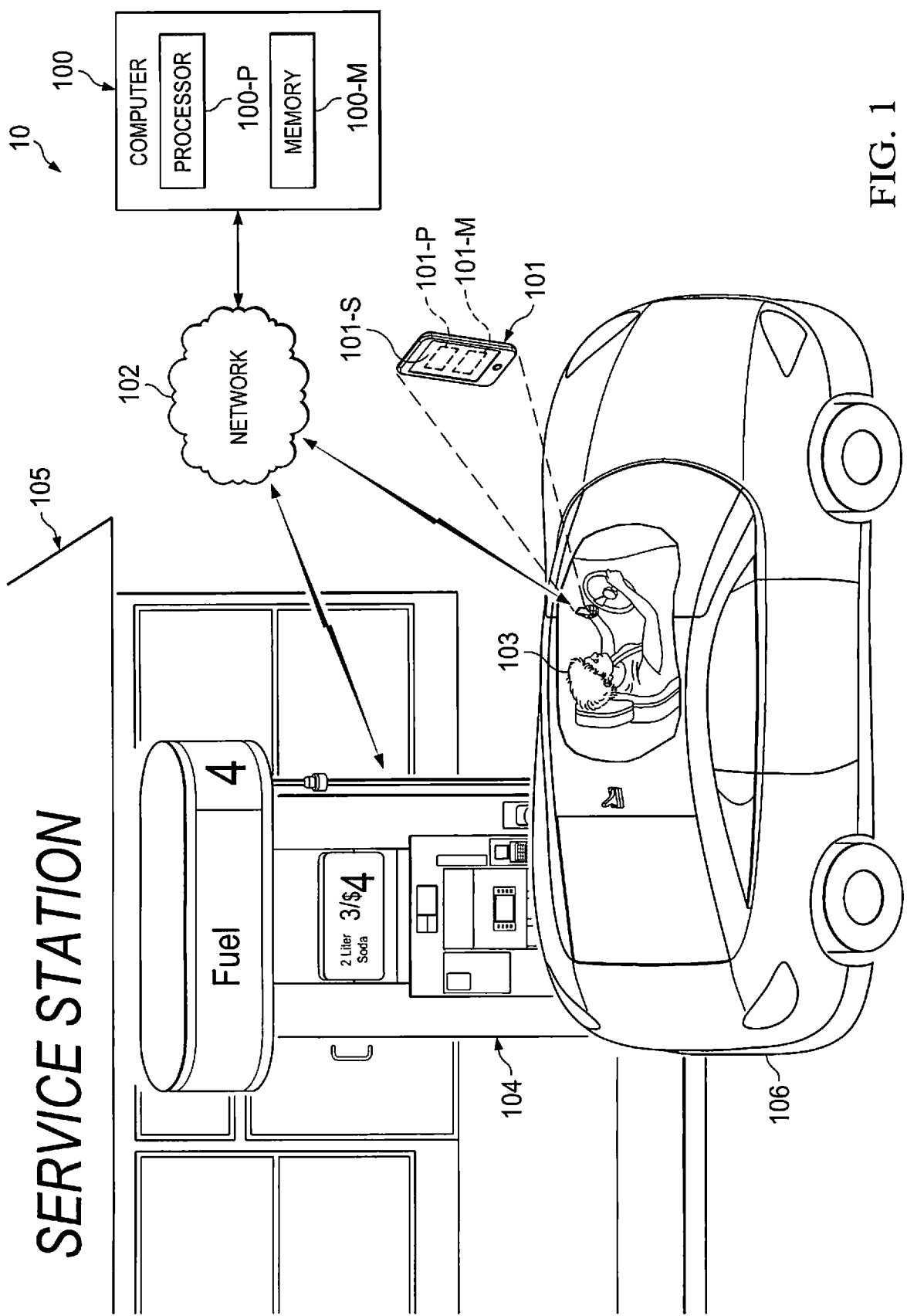
FIG. 1 illustrates a system for emulating a fuel pump on a mobile device and marketing on a mobile device, according to embodiments of the invention.

FIG. 1 illustrates system 10 for emulating a fuel pump on a mobile device and marketing on a mobile device according to embodiments of the invention. System 10 includes computer system 100 in communication with mobile device 101 and fuel pump 104, via network 102. Computer system 100 includes memory 100-M and processor 100-P. Mobile device 101 may be a hand-held processor-based mobile device such as a smart phone, a tablet, computer; or other processor-based mobile device such as a vehicle or a communication system of a vehicle. The communication system of a modern vehicle is much like a computer or smart phone as it has memory, a processor, a display, keypads, touch screen etc. But the vehicle communication system may have access to even more information than other mobile devices. Such information may include the service data pertaining to a vehicle, the number of persons present in the vehicle, the location of the vehicle (e.g. from a vehicle navigation system), and the planned route of the vehicle (e.g. from a vehicle navigation system) etc.

Network 102 provides communication links with respect to devices and by and between components of the system for carrying out the fuel transactions, emulation of a fuel pump, and advertising as disclosed herein. Accordingly, the links of network 102 are operable to provide suitable communication links for facilitating cooperative interaction and data transfer as described herein. Network 102 of embodiments may thus comprise one or more of a local area network (LAN), metropolitan area network (MAN), wide area network (WAN), wireless LAN (WLAN), the Internet, intranet, extranet, cable transmission system, cellular communication network, the like and combinations thereof. Network 102 may include or be connected to multiple networks operated by different entities. For example, the network 102 may include a first network (e.g., a payment processing network) operated by a first network operator (e.g., a financial card payment processing entity, a credit card company, a bank, etc.) and a second network (e.g., a LAN, WAN, WLAN, wireless WAN, etc.) operated by a second operator (e.g., a fueling station, an operator of a chain of fueling stations, a fuel marketing company etc.).

Thus, network 102 may connect a plurality of fuel pumps 104 of a plurality fuel stations, remote from each other, to one or more networks (e.g., a financial network, a banking network, a payment processing network, a loyalty rewards network, a merchant services network, a gift card network, a pre-paid financial card network, a fuel marketing company network etc.). In embodiments of the invention, network 102 may include one or more devices that are configured to communicate with particular ones of the one or more networks, such as a financial transaction server that is configured to communicate with the financial network, the banking network, the payment processing network, the merchant services network, the gift card network, the pre-paid financial card network, etc. to process payment information associated with a financial account, a financial card (e.g., a debit card, a credit card, a gift card, a pre-paid financial card, etc.) and the like.

Network 102 may provide fuel pump 104 with access to the one or more networks mentioned above for processing payment information, discount information, loyalty reward information, etc. (e.g., processing or validating check payments, processing debit card transactions, processing credit card transactions, processing loyalty rewards information, processing gift card transactions, processing pre-paid financial card transactions, processing coupons, processing promotional offers, etc.). In embodiments of the invention, fuel pump 104 may have direct access to the one or more networks and may cooperate with these networks to process the payment information, the discount information, the loyalty reward information, etc.

FIG. 1 also shows fuel pump 104 for pumping fuel into vehicles and metering the amount of fuel pumped into each vehicle, such as vehicle 106 operated by consumer 103. Fuel pump 104 may also be configured to receive payment for the amount of fuel metered as being delivered to vehicle 106. In embodiments of the invention, consumer 103 operates mobile device 101 to execute software to communicatively connect, through network 102, to computer system 100 in order to emulate fuel pump 104 on mobile device 101 and receive marketing information on mobile device 101. Computer system 100 and mobile device 101 may include one or more processors (e.g., a CORE or PENTIUM processor available from Intel, Inc.) and processor readable (e.g., computer readable) memory (e.g., random access memory (RAM), read only memory (ROM), flash memory, disk memory, solid state drive (SSD) memory, optical memory, and/or the like) and input/output components (e.g., display, network interface card (NIC), keyboard, digital pointer, printer, and/or the like) coupled to a processor of the one or more processors via a data bus. In embodiments of the invention, computer system 100 may be remote from fuel pump 104 and may also be remote from the service station at which fuel pump 104 is located. In embodiments of the invention, computer system may be located at the service station of fuel pump 104 (e.g. in a building at the backcourt).

Figure 2:
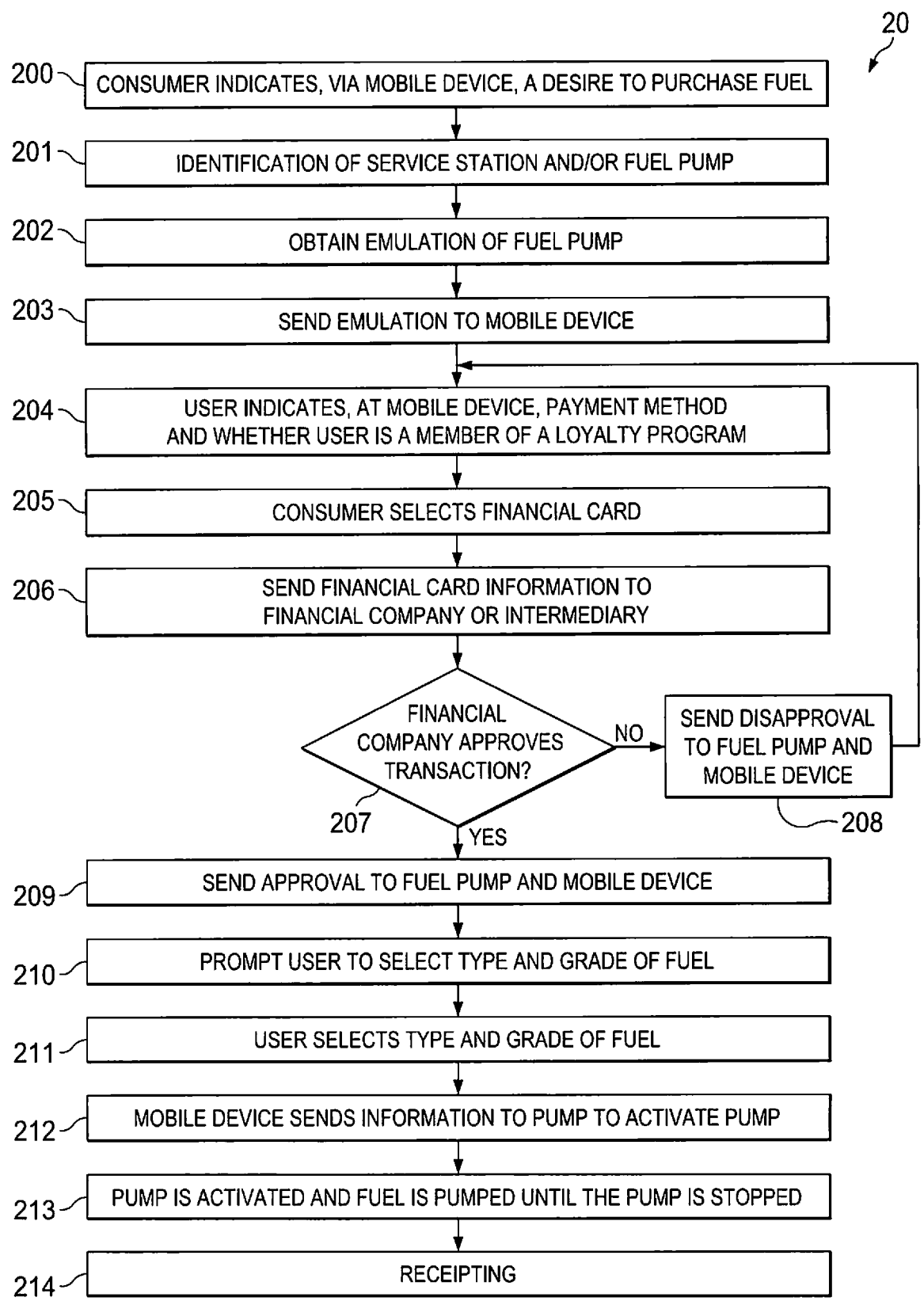
FIG. 2 illustrates a process for emulating a fuel pump on a mobile device and marketing on a mobile device, according to embodiments of the invention.
Figure 3A:
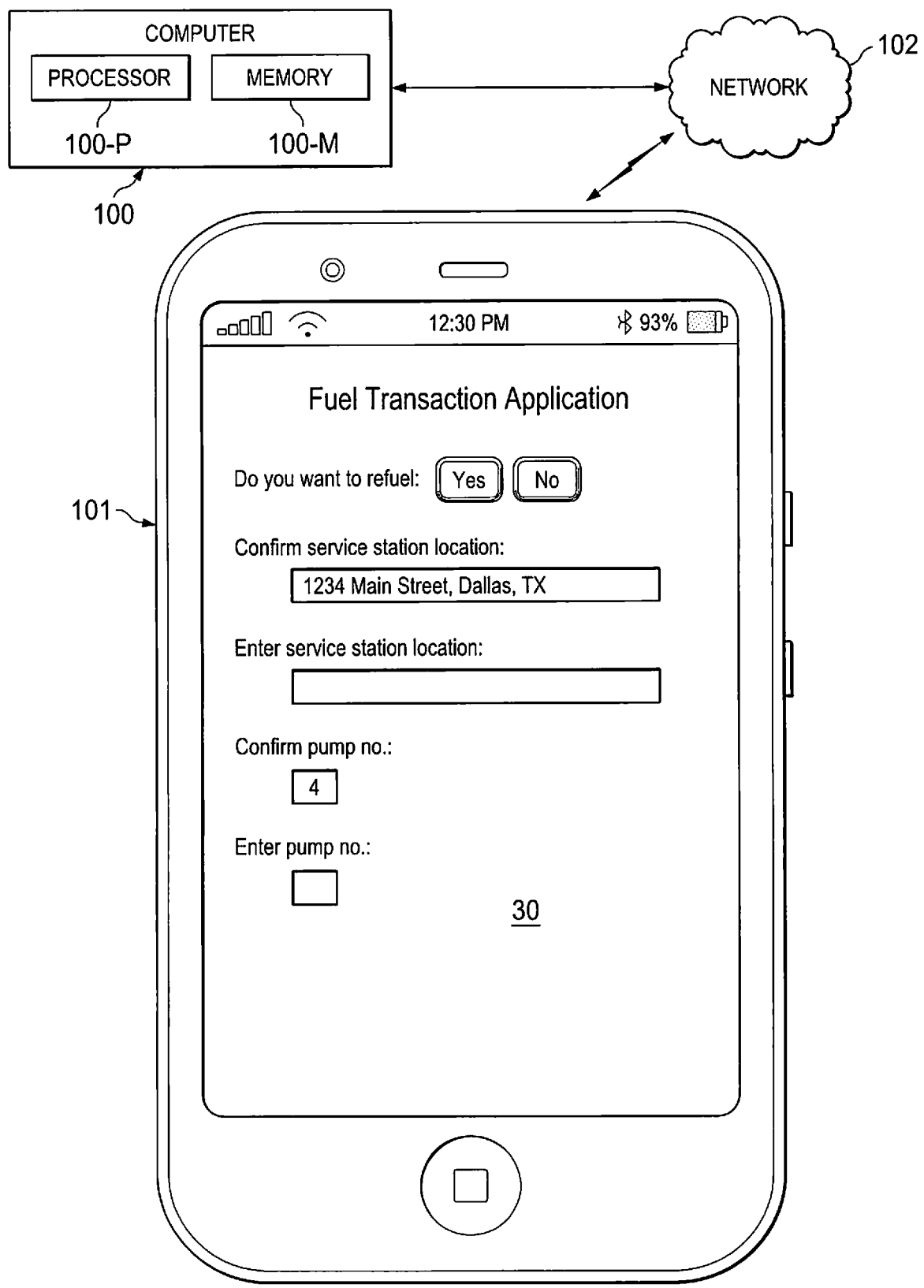
FIGS. 3A-3K illustrate graphical user interfaces on a mobile device, according to embodiments of the invention.

FIG. 2 illustrates process 20 for emulating a fuel pump and marketing on a mobile device according to embodiments of the invention. Process 20 may be performed by system 10. Process 20 may start at block 200, which involves consumer 103 indicating a desire to carry out a fuel transaction, for example, by sending such information from mobile device 101 to computer system 100. In turn, computer system 100 may use this information or send this information to fuel pump 104 or to a computer that controls fuel pump 104. Consumer 103 may indicate the desire to carry out the fuel transaction, by entries on a touch screen of mobile device 101. These entries on the touch screen may be for opening and operating a fuel transaction application on mobile device 101. The touch screen may present a graphical user interface of the application that runs on mobile device 101, as shown in GUI 30 of FIG. 3A. Consumer 103's interaction with the graphical user interface on mobile device 101 may involve interaction with icons on the graphical user interface. Of course, interaction between consumer 103 and mobile device 101 as described herein, may be made by other means such as by keyboard, touch-screen keyboard interface, a microphone along with voice recognition software (which may be used to dictate instructions) and a speaker (which mobile device 101 may use to communicate information to consumer 103) etc. At block 201, mobile device 101 may transmit information to computer system 100 that identifies the service station or fuel pump, or both, at which consumer 103 desires to carry out the transaction. In embodiments of the invention, consumer 103 may provide instructions to mobile device 101 to cause mobile device 101 to send the information that identifies fuel pump 104 or the service station, to processor 100-P. It should be noted that the transmitted information that is used for identifying the service station or fuel pump may include a QR code, bar code, an identification number, an address, and combinations thereof. Of course, in order to transmit a QR code or bar code, mobile device 101 may be equipped with a QR code reader and a bar code reader. In embodiments of the invention, fuel pump 104 or mobile device 101 may automatically send the information that identifies fuel pump 104 to processor 100-P. Mobile device 101 or fuel pump 104 may be configured to automatically send information to processor 100-P when mobile device 101 comes within a predetermined distance from fuel pump 104. For example, mobile device 101 and fuel pump 104 may automatically communicate with each other, for example, by Wi Fi or Bluetooth when they are at a predetermined distance from each other. In embodiments of the invention, mobile device 101 may automatically send identification information to fuel pump 104 by Wi Fi, Bluetooth etc. when mobile device 101 is within the predetermined proximity of fuel pump 104. In turn, fuel pump 104 may send this information to processor 100-P. Alternatively or additionally, when the devices are within the predetermined proximity of each other, mobile device 101 may receive identifying information from fuel pump 104 by Wi Fi, Bluetooth etc. and send this information directly to processor 100-P. In embodiments of the invention, mobile device 101 may be configured to automatically send information to processor 100-P when consumer 103 indicates, on mobile device 101, that consumer 103 desires to start a fuel transaction.

In embodiments of the invention, a global positioning system in communication with processor 101-P may identify the service station or fuel pump, or both. In this way, processor 101-P receives global positioning system information that establishes mobile device 101 is at service station 105 and at fuel pump 104. Based on this global positioning information, an address is determined and presented to consumer 103. Consumer 103 may confirm the address presented by, for example, tapping on the address presented as shown on GUI 30, FIG. 3A.

Alternatively, consumer 103 may enter a service station location, via GUI 30, to mobile device 101. Mobile device 101 then sends this location to computer system 100. It should be noted that the transmitted information that is used for identifying the service station or fuel pump, or both, may include a QR code, bar code, an identification number, an address, and combinations thereof.

At block 202, computer system 100 obtains emulation data (e.g. data regarding the following: information presented at fuel pump 104, information generated at fuel pump 104, features of fuel pump 104, control elements of fuel pump 104, prompts presented at fuel pump 104) in response to receiving information that consumer 103 desires to carry out a fueling transaction. Computer system 100 may obtain at least some of the emulation data by processor 100-P creating the emulation data regarding fuel pump 104 based on information received by processor 100-P regarding fuel pump 104, from fuel pump 104. For example, processor 100-P may request and receive information such as the type and grade of fuel sold at pump 104, the current price of each fuel sold at pump 104, the payment methods that may be used at pump 104 and promotions that apply to purchases at fuel pump 104 etc. Processor 100-P may also obtain the emulation data when mobile device 101 sends the emulation data to processor 100-P as it exists at fuel pump 104 or as it is generated at fuel pump 104.

Alternatively or additionally, computer system 100 may obtain at least some of the emulation data by processor 100-P receiving an image of the fuel pump and by image recognition techniques, determine at least some of the emulation data (e.g. price, type and grade of fuel). In embodiments of the invention, computer system 100 obtains at least some of the emulation data by processor 100-P receiving emulation data from another processor or from a database that stores emulation data for a plurality of fuel pumps and a plurality of service stations.

Figure 3B:
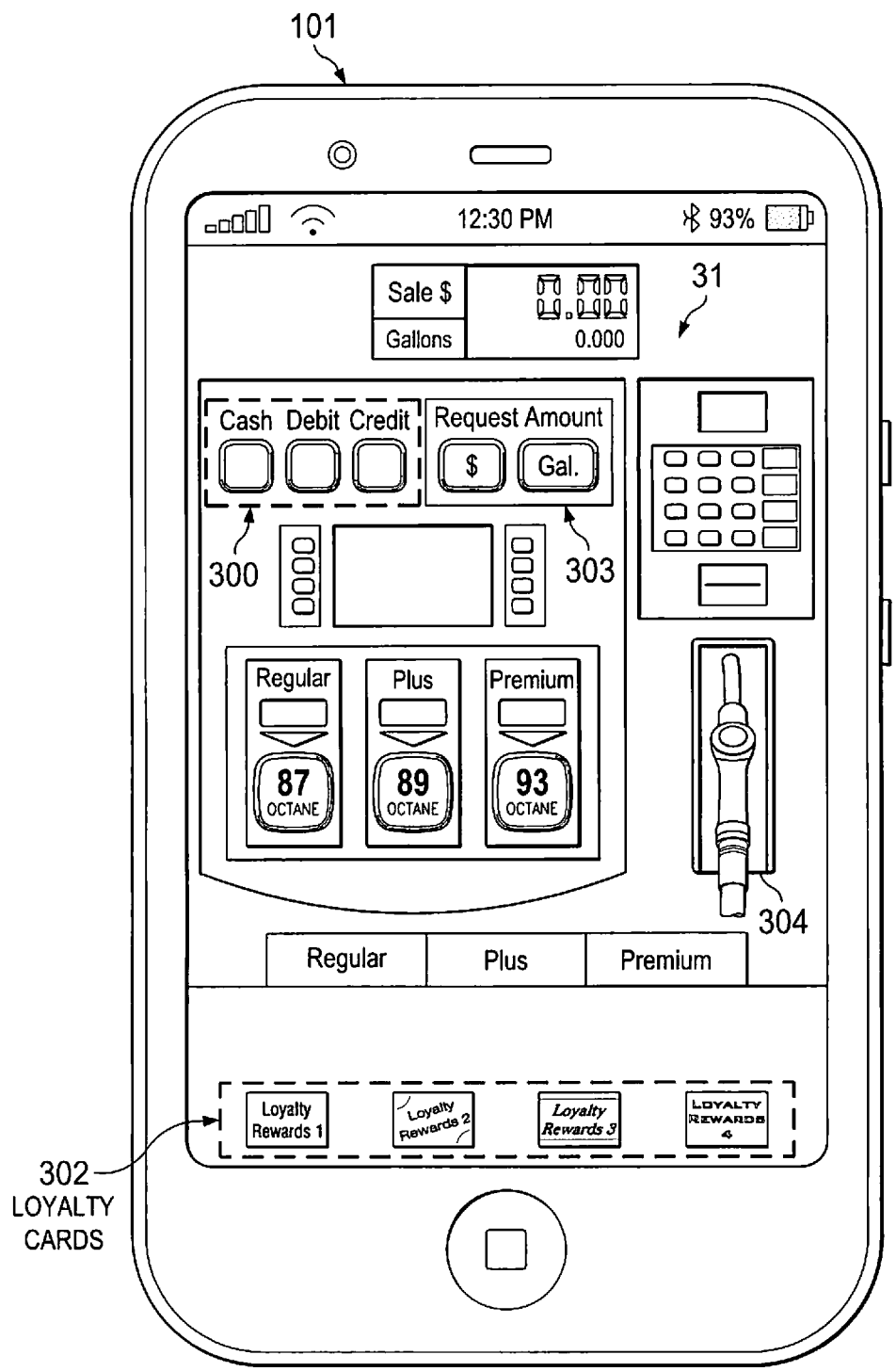

Block 203 involves processor 100-P sending the obtained emulation data to mobile device 101. The emulation data received at mobile device 101 is presented, for example, as a graphical user interface on screen 101-S so that consumer 103 can view a representation of, and control operation of, fuel pump 104, from mobile device 101. In this way, consumer 103 can carry out steps of the fuel transaction that would normally be carried out at the pump or at the backcourt of the service station. In other words, the emulation data causes mobile device 101 to emulate fuel pump 104. For example, FIG. 3B shows GUI 31 including an emulation of fuel pump 104 on screen 101-S of mobile device 101. Emulation of fuel pump 104 may include an imitation of fuel pump 104 on mobile device 101 such that mobile device 101 displays aspects of fuel pump 104. This emulation provides consumer 103 with information regarding fuel pump 104 and control over fuel pump 104 just as if consumer 103 were standing at fuel pump 104. Although, in embodiments of the invention, an identical representation or near identical representation of fuel pump 104 may be presented on mobile device 101, such identical representation of fuel pump 104 on mobile device 101 is not necessary. For example, due to space on screen 101-S, certain features of fuel pump 104 may not be included in the graphical user interface.

Fuel pump 104 may include input devices such as a financial card reader, a keyboard and/or the numeric keypad (e.g., for providing inputs such as a zip code, a personal identification number (PIN), designating a financial transaction as a debit transaction, credit transaction, prepaid transaction, or gift card transaction, selecting additional services, such as a carwash, etc.), and one or more sensors for detecting or determining an amount of fuel dispensed. Financial cards, as described herein, may include a credit card, a debit card, a gift card, a pre-paid card etc. The emulation of fuel pump 104 may include presenting one or more of these input devices on the graphical user interface of mobile device 101.

Thus, in embodiments, the features of fuel pump 104 provided in the emulation on screen 101-S may include only those features determined sufficient for consumer 103 to control one or more operations of fuel pump 104. Further, more information and features etc. may be provided on screen 101-S than is provided at fuel pump 104 (e.g. presenting icons representing consumer 103's financial cards). On the graphical user interface of screen 101-S, one or more functionalities of fuel pump 104 may be represented, for instance, by an icon such that activating the icon on the graphical user interface has the effect of activating the corresponding functionality on fuel pump 104. This may be implemented such that activating the icon on the graphical user interface sends a signal to computer system 100, which sends a signal to fuel pump 104. This signal, received at fuel pump 104, activates at fuel pump 104, the feature that corresponds to the icon.

Figure 3C:
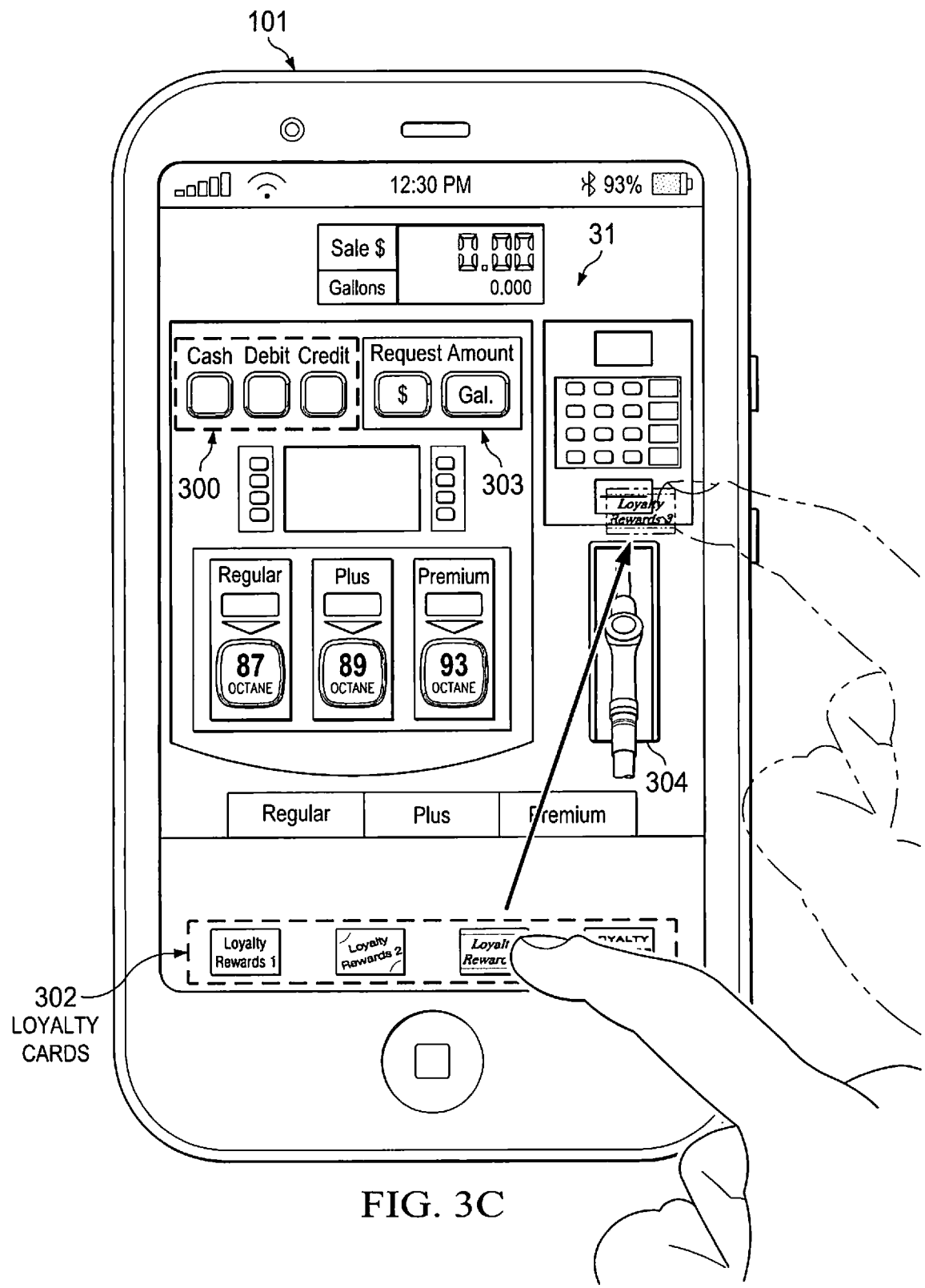
Figure 3D:
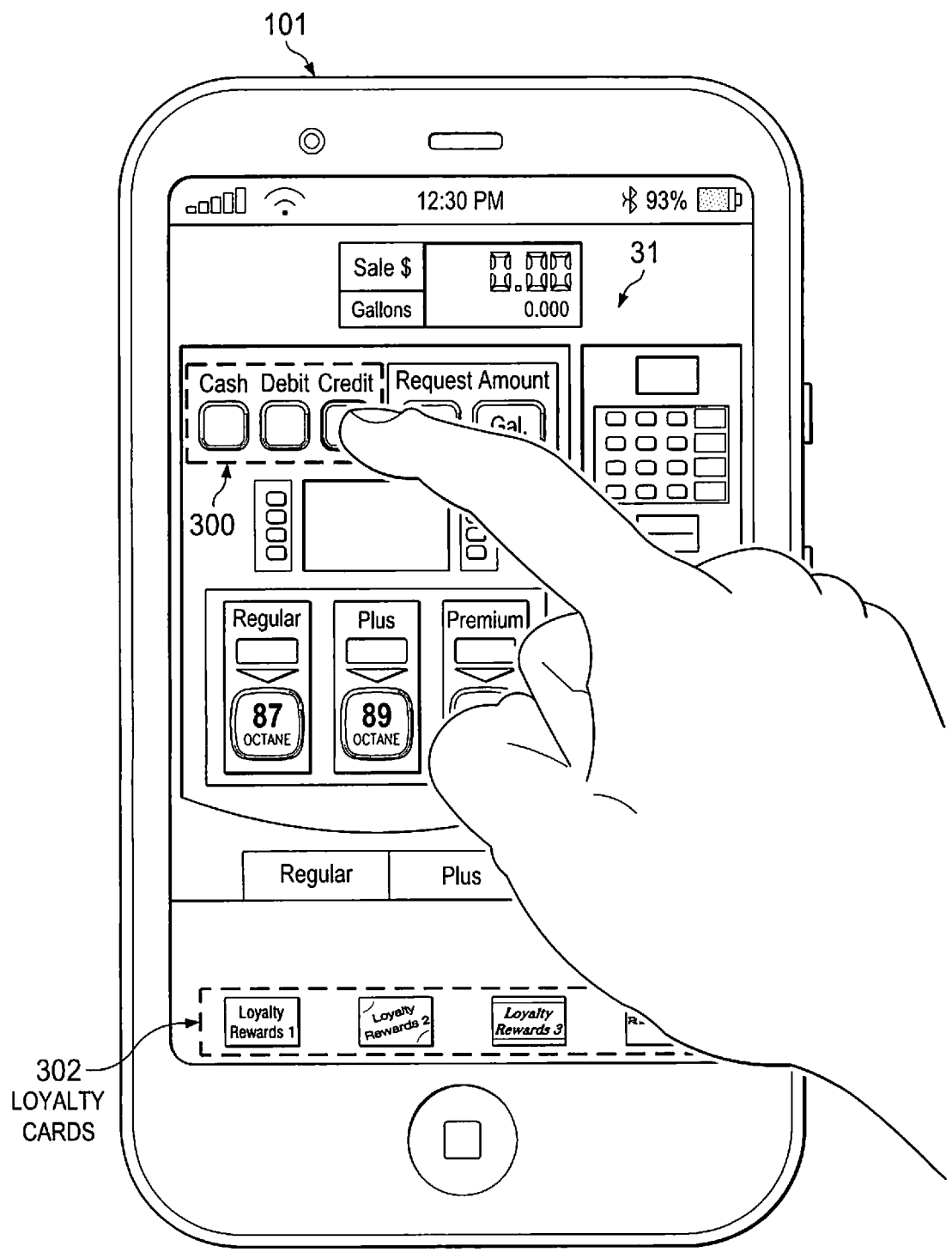
Figure 3E:
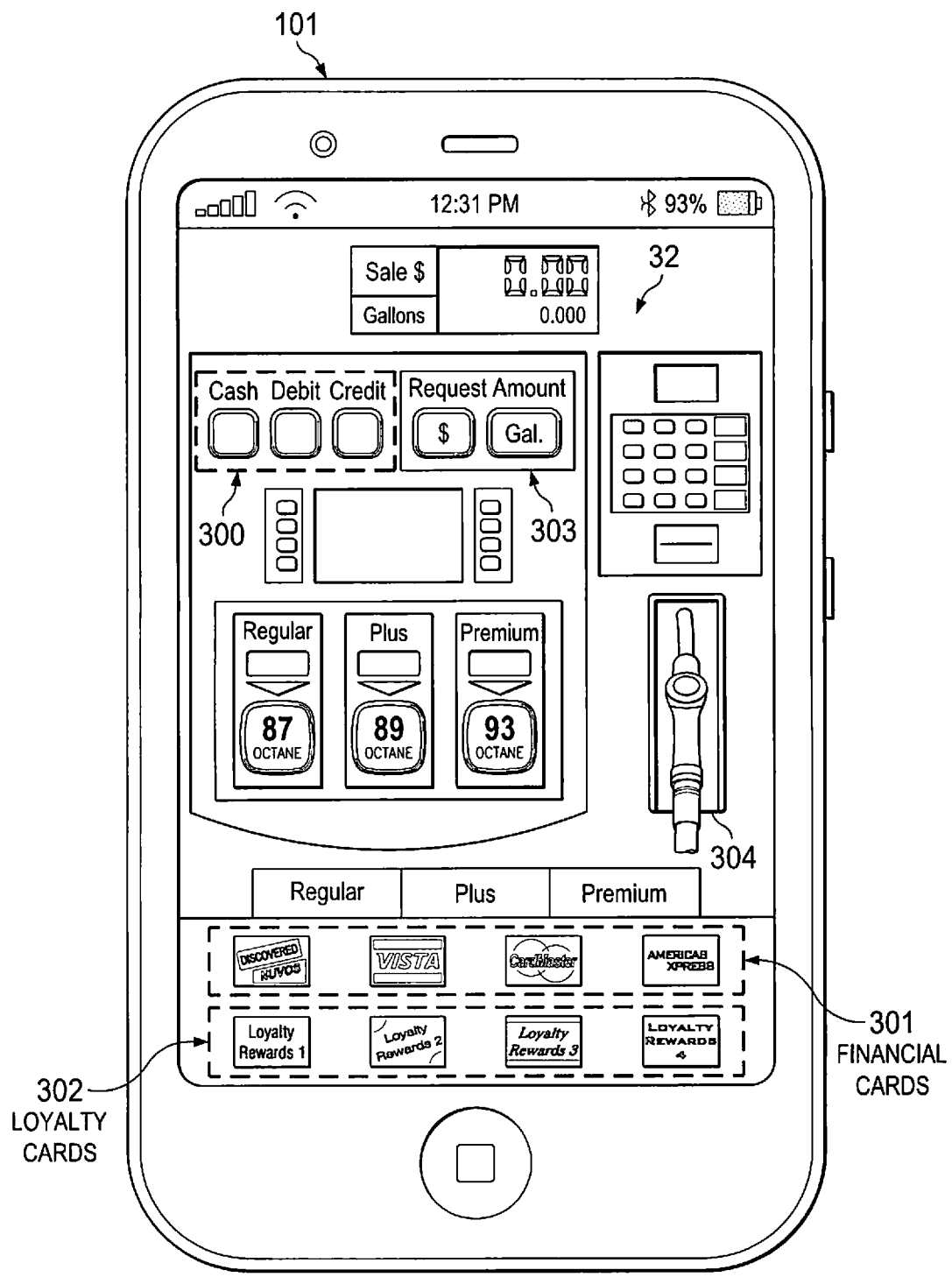
Figure 3F:
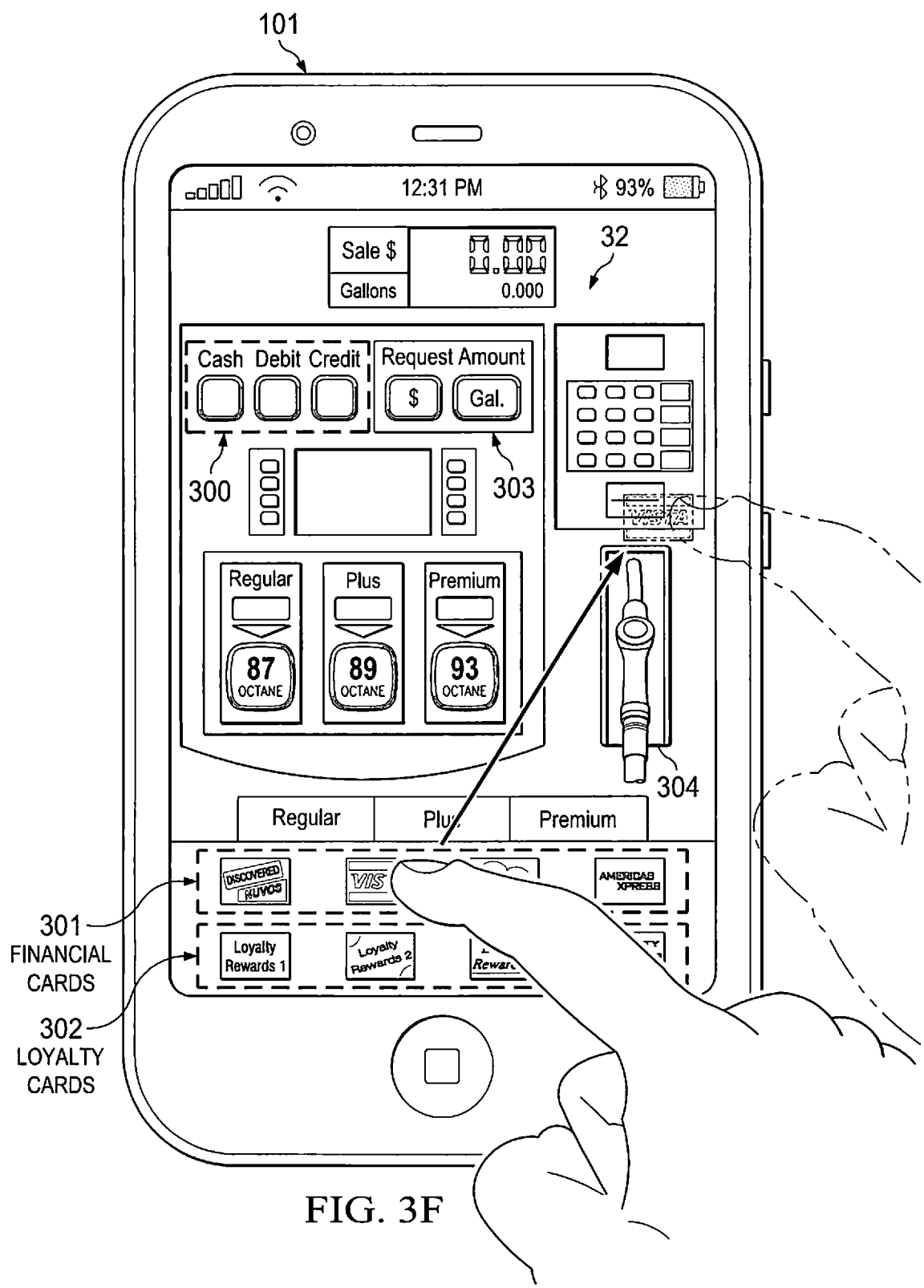

For example, there may be an icon that, when activated, starts or stops the pump. There may also be one or more icons that when activated, selects a type of fuel or a grade of fuel, or both. As such, these icons operate similarly to the actual buttons on fuel pump 104 because when these buttons are pressed on fuel pump 104 the same selections are put into effect. Further, there may be an icon representing the insertion of a financial card in a card reader. When this icon is activated, information is provided to computer system 100 that would normally be read from a financial card that is inserted into a card reader of fuel pump 104 (FIG. 3F). Similarly, there may be an icon representing the insertion of a loyalty card in a card reader, which when activated, causes information to be provided to computer system 100 (FIG. 3C). Such information would normally be read from a loyalty card inserted in a card reader of fuel pump 104. On activation of the icons mentioned above, information is sent to processor 100-P, which in turns sends information to fuel pump 104 to control the function of the pump, or sends information to another processor in order to carry out a step of the fuel transaction, or both (e.g. user information regarding the financial card or loyalty card).

In embodiments of the invention, information presented at fuel pump 104 may also be presented on the graphical user interface on screen 101-S. This information presented may be information that remains the same throughout the fuel transaction (e.g. price of fuel) or information that changes or is generated at fuel pump 104 during the transaction (e.g. volume of fuel transferred to vehicle, value of fuel transferred to vehicle). The duration of the transaction may be from the moment consumer 103 indicates that a fuel transaction is desired until when pumping of fuel is completed and consumer 103 is charged for the fuel pumped. In transactions that include receipting, the duration of the transaction may be from the moment consumer 103 indicates that a fuel transaction is desired until when a receipt is issued for fuel pumped. In embodiments of the invention, some icons on the graphical user interface, resulting from the emulation of fuel pump 104, may only provide information and no functionality. For example, the display screen on fuel pump 104, may be emulated on a display section of mobile device 101 such that any information that is displayed on the display screen of fuel pump 104 is transmitted to processor 100-P, which transmits it to mobile device 101. Then mobile device 101 displays the information on a display area of the graphical user interface. There may be more than one display sections on fuel pump 104 and on mobile device 101. The one or more display sections may include a display of instructions, queries, the volume of fuel transferred to a vehicle, the value of fuel transferred to a vehicle and the like.

Fuel pump 104 may be configured to periodically provide the emulation data to mobile device 101 via computer system 100 in response to changes in the information presented at fuel pump 104. For example, fuel pump 104 may generate and transmit the emulation data every time there is a change of information presented. Alternatively or additionally, fuel pump 104 may be configured to generate and transmit the emulation data at a desired frequency. For example, fuel pump 104 may generate and transmit the emulation data a particular number of times over a period (e.g., 10 times per minute). In some aspects, the fuel pump 104 may transmit the emulation data to computer system 100 after each input is received. Computer system 100 may then generate and transmit the emulation data at the desired frequency, or may generate and transmit emulation data each time the emulation data is received. Thus, fuel pump 104 and computer system 100 may dynamically generate updated emulation data based on the information at the fuel pump 104. The updated emulation data may be provided to mobile device 101. The updated emulation data may be configured to cause the emulation of fuel pump 104, at mobile device 101, to be dynamically updated during the fuel transaction. The emulation data may be provided to the mobile device 101 in real-time or near real-time.

In embodiments of the invention, at certain times during the fuel transaction, the volume of fuel transferred to a vehicle, the value of fuel transferred may be calculated by the software on mobile device 101, instead of such information being continuously transmitted to mobile device 101 from fuel pump 104 via processor 100-P. In other words, mobile device 101 may know the pumping rate of fuel pump 104 and be able to calculate the volume of fuel pumped or the value of fuel pumped, or both, based on receiving information as to when pumping started, how much time has elapsed since pumping started, and the cost of the gasoline. The rate may be provided to mobile device 101, for example, by processor 100-P based on the identification of fuel pump 104. The rate may also be calculated from an initial flow of information (e.g. an amount of fuel pumped or a value of fuel pumped, or both, over an initial period) from fuel pump 104 to processor 100-P and then to mobile device 101. According to embodiments, emulation of fuel pump 104 on mobile device 101 may occur such that as a feature or information at fuel pump 104 changes, during a fuel transaction, so too does a corresponding feature or information change at the graphical user interface of mobile device 101.

Referring to FIG. 3B, GUI 31 includes icons 300, which indicates the methods of payment available at fuel pump 104. Consumer 103 may select one of icons 300 to select a payment method, for example, payment by credit card, payment by debit card, payment by gift card, payment by pre-paid card, payment by cash, payment by check, loyalty card etc., at block 204. At block 204, consumer 103 may also indicate that consumer 103 is a member of a loyalty program. In embodiments of the invention, this may include selecting from a plurality of loyalty programs (represented by icons 302 (FIG. 3C). Processor 101-P may transmit this information regarding the selection to processor 100-P. The loyalty program, in embodiments, may reduce the cost of the fuel (e.g. reduce the price per gallon of the fuel) if consumer 103 is a member of the loyalty program and meets predetermined criteria. Processor 100-P or processor 101-P, or both working together, may be adapted to determine, for the financial transaction being contemplated, which of the loyalty programs is more beneficial financially to use for the fuel transaction.

One loyalty program, for example, may provide a one dollar discount per gallon while another may provide a two dollar discount, under existing conditions such as location, promotions being offered at the time etc. At other times, under different conditions, the loyalty program that was previously financially more beneficial to use may no longer be the financially more beneficial option. The determination as to which loyalty program is more financially beneficial may be made using information such as the fuel price at the location, the amount of fuel to be purchased (based on amount of fuel presently in vehicle 106), the rules of each loyalty program and the rewards to which consumer 103 is presently entitled etc. Processor 100-P, or processor 101-P, or both working together, may be able to determine which loyalty program would provide the most rewards for a purchase. It may also determine, based on a purchase, which of consumer 103's loyalty program will achieve a certain threshold.

Similarly, processor 100-P or processor 101-P, or both working together, may be adapted to determine, for the transaction being contemplated, which of the payment methods or cards is more beneficial financially to use for the fuel transaction. This determination may be made from information such as the fuel price at the location, the amount of fuel to be purchased (based on amount of fuel presently in vehicle 106), the rules associated with each card (e.g. cash back rules), the rules any loyalty program being used and the rewards to which consumer 103 is presently entitled from the loyalty program being used etc.

FIG. 3C shows consumer 103 making a selection of a loyalty program by dragging and dropping one of icons 302 from the group of loyalty program icons to the icon representing a card reader. FIG. 3D shows consumer 103 making a selection of a payment method by tapping one of icons 300 from the group of payment method icons. When consumer 103 makes a selection of a loyalty program or payment method or card by, for example, tapping on one of icons 300 or 302, the application on mobile device 101 may prompt consumer 103 to indicate which of a plurality of cards to use to pay for the fuel. The prompt may involve a display of cards 301 as shown in GUI 32 of FIG. 3E.

And at block 205, consumer 103 may select one of these cards by tapping on the card or moving the selected card to a payment slot as shown in FIG. 3F. The information pertaining to the various cards may be stored in memory 101-M of mobile device 101.

Once the selection of the financial card is made, at block 206, processor 101-P sends information pertaining to the financial card, and the transaction, to the financial card company or an intermediary, to request verification that the financial card can properly be used for the transaction. In embodiments, processor 100-P acts as an intermediary and sends the information to the financial card company, requesting authorization verification that the financial card can properly be used for the transaction. If the company is a credit card company, the information may include information that a credit card company may use to authorize credit. Similarly, if the company is a debit card company, the information may include information that a debit card company may use to authorize debit.

The financial card company (e.g. credit card company, debit card company, gift card company, pre-paid card company) approves or disapproves the credit or debit or use of the financial card at block 207. If the credit request or debit request or use of the financial card is disapproved, that information may be sent to computer system 100 for appropriate action. The information about the disapproved request may be sent by processor 100-P to fuel pump 104 and to mobile device 101, at block 208. At this point, the transaction may be terminated or continued by a return to block 204. If the credit request or debit request or use of the financial card is approved, that information is sent by processor 100-P to fuel pump 104 and to mobile device 101, at block 209.

Figure 3G:
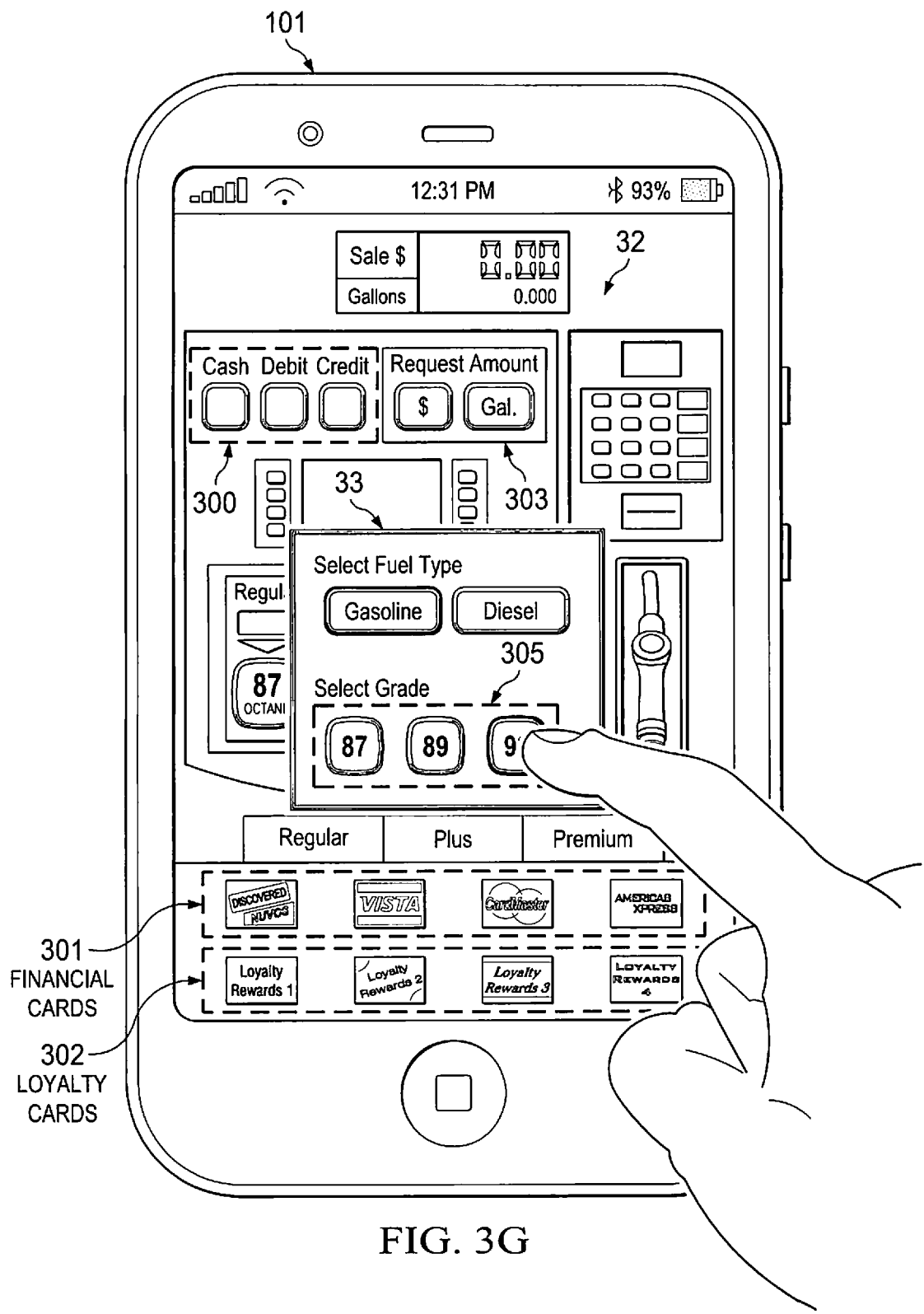
Figure 3H:
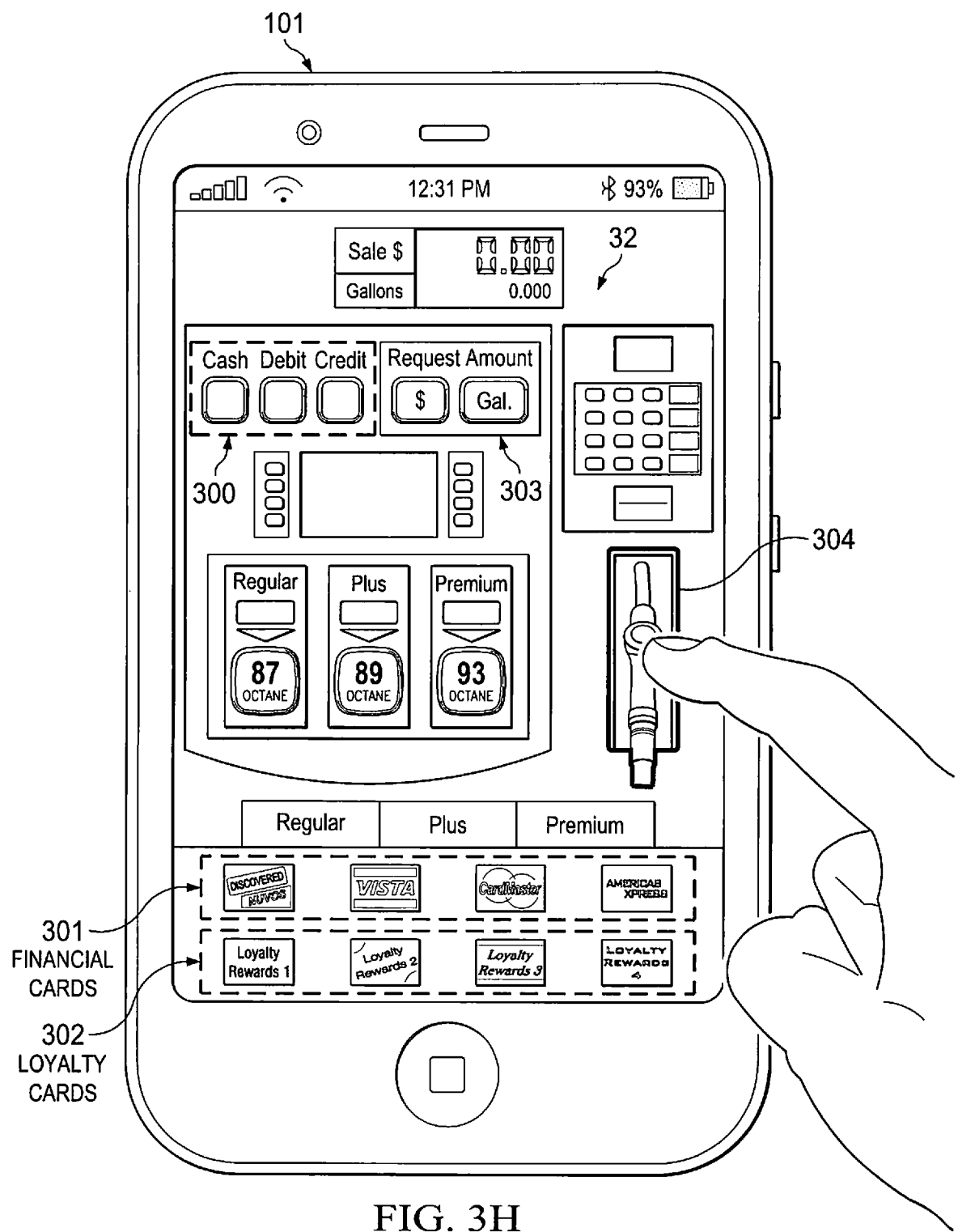
Figure 3I:
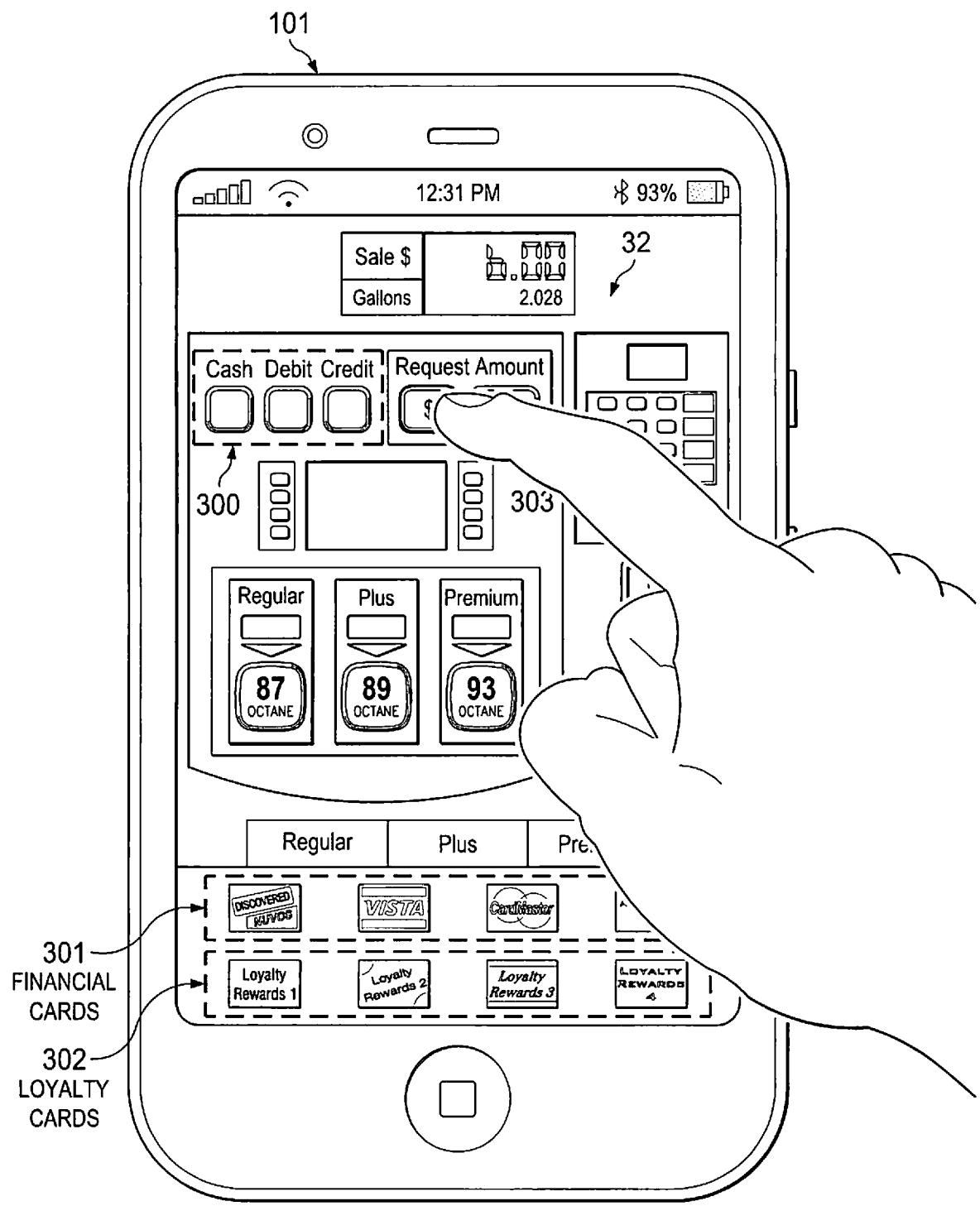
Figure 3J:
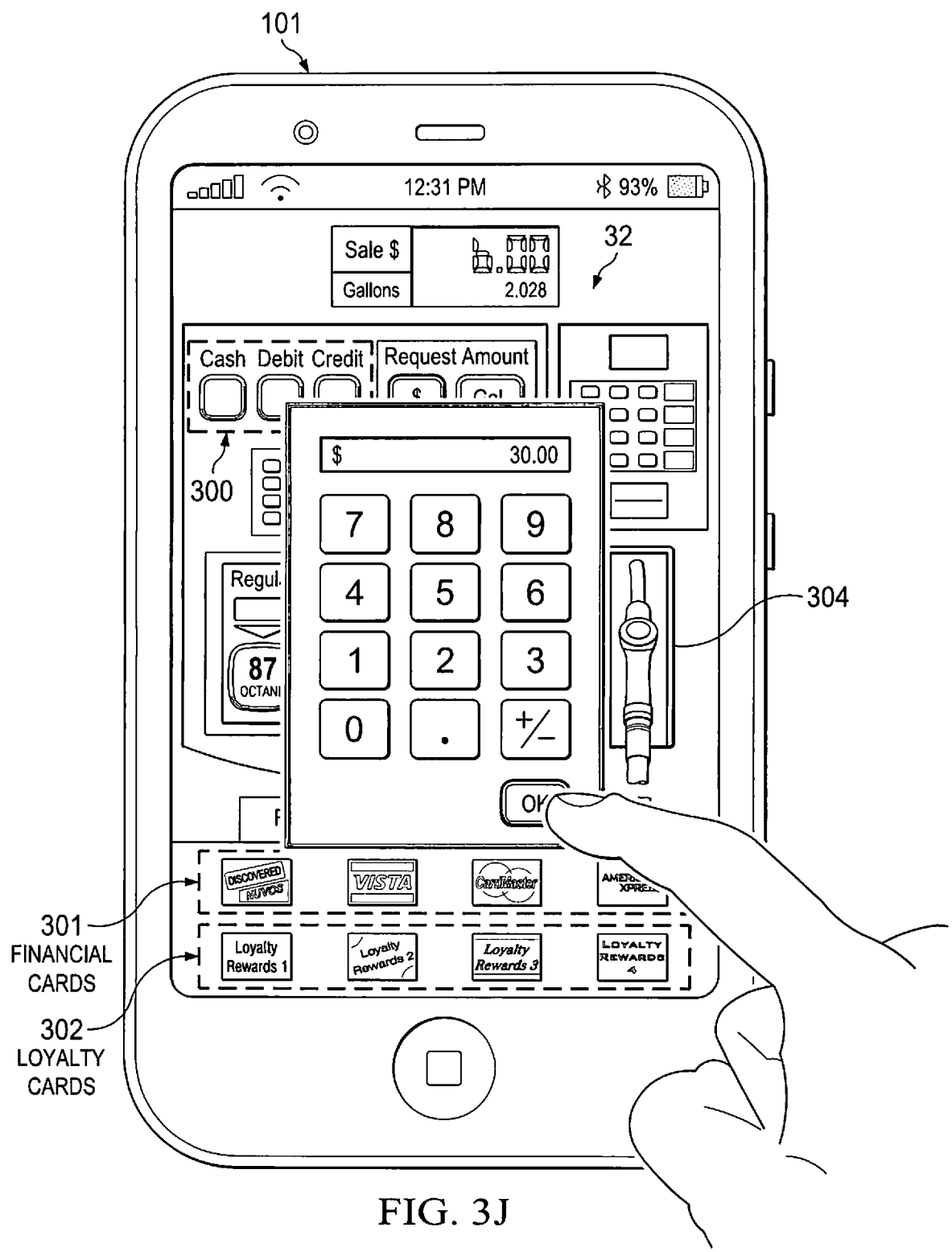

At block 210, fuel pump 104 receives the approval and prompts consumer 103 to select a type and grade of fuel. Pump 104 may send information regarding this prompt to processor 100-P and mobile device 101. In this way, the prompt may be reflected on the emulation on mobile device 101, as shown by GUI 33, FIG. 3G, based on emulation data received from processor 100-P.

At block 211, consumer 103 selects the type and grade of fuel by selecting one of icons 305. Icons 305 represent the different types and grade of fuel and consumer 103 may select any of the types and grades of fuel by, for example, tapping or clicking on any of the icons. Once consumer 103 has made such a selection, at block 212, mobile device 101 sends this information to processor 100-P, which sends information to fuel pump 104 to pump the selected type and grade of fuel.

When fuel pump 104 receives this information, at block 213, fuel pump 104 is activated and consumer 103 or a service station attendant places the pump nozzle into the fuel tank. Fuel pump 104 begins pumping fuel when consumer 103 or the service station attendant physically activates the nozzle or when consumer 103 taps icon 104 to indicate pumping should start. As fuel is being pumped, the amount of fuel pumped and the value of fuel pumped changes on fuel pump 104 and these changes may also be reflected in the emulation on mobile device 101. Fuel pump 104 may send these changes to mobile device 101 via processor 100-P. Consumer 103 may use icon 303 to send instructions to preset a fuel amount or a dollar amount at which pumping should stop. Alternatively, consumer 103 may stop fueling by activating icon 304 to send instructions to fuel pump 104 to stop pumping. These instructions may be sent to processor 100-P, which, in turn, sends the information to fuel pump 104. In this way, except for the insertion of the nozzle into vehicle 106, consumer 103 controls the fuel transaction from mobile device 101.

In embodiments of the invention, consumer 103 can also control a non-fuel transaction from mobile device 101. This non-fuel transaction may be instigated by an advertisement or promotion presented on mobile device 101 as described below. Alternatively or additionally, consumer 103, may simply decide to transact for a non-fuel product. For example, during a fueling transaction, consumer 103 may wish to purchase food from the back-court of the service station. Consumer 103 may use additional features of the fuel transaction application on mobile device 101 or consumer 103 may use a different application for non-fuel product transaction on mobile device 101 to make enquires about the non-fuel product or to order the non-fuel product. Mobile device 101 sends the enquiry or order to processor 100-P. Processor 100-P may then send the enquiry or order to a point-of sale system at the backcourt of the service station at which consumer 103 is refueling. An attendant at the service station may respond to enquiries by sending messages back to mobile device 101 via processor 100-P. The enquiry and response may be about different types of the non-fuel product, pricing of the non-fuel product, promotions pertaining to the non-fuel product etc. For orders, the service station attendant may fill the order and deliver it to consumer 103. Alternatively, consumer 103 may go to the backcourt to collect the ordered item. Consumer 103 may pay for the non-fuel product transaction when the order is collected at the backcourt. However, consumer 103 may also pay for the non-fuel product by using mobile device 101 to send payment information to processor 100-P, which then sends it to the point of sale system at the backcourt of the service station.

Figure 3K:
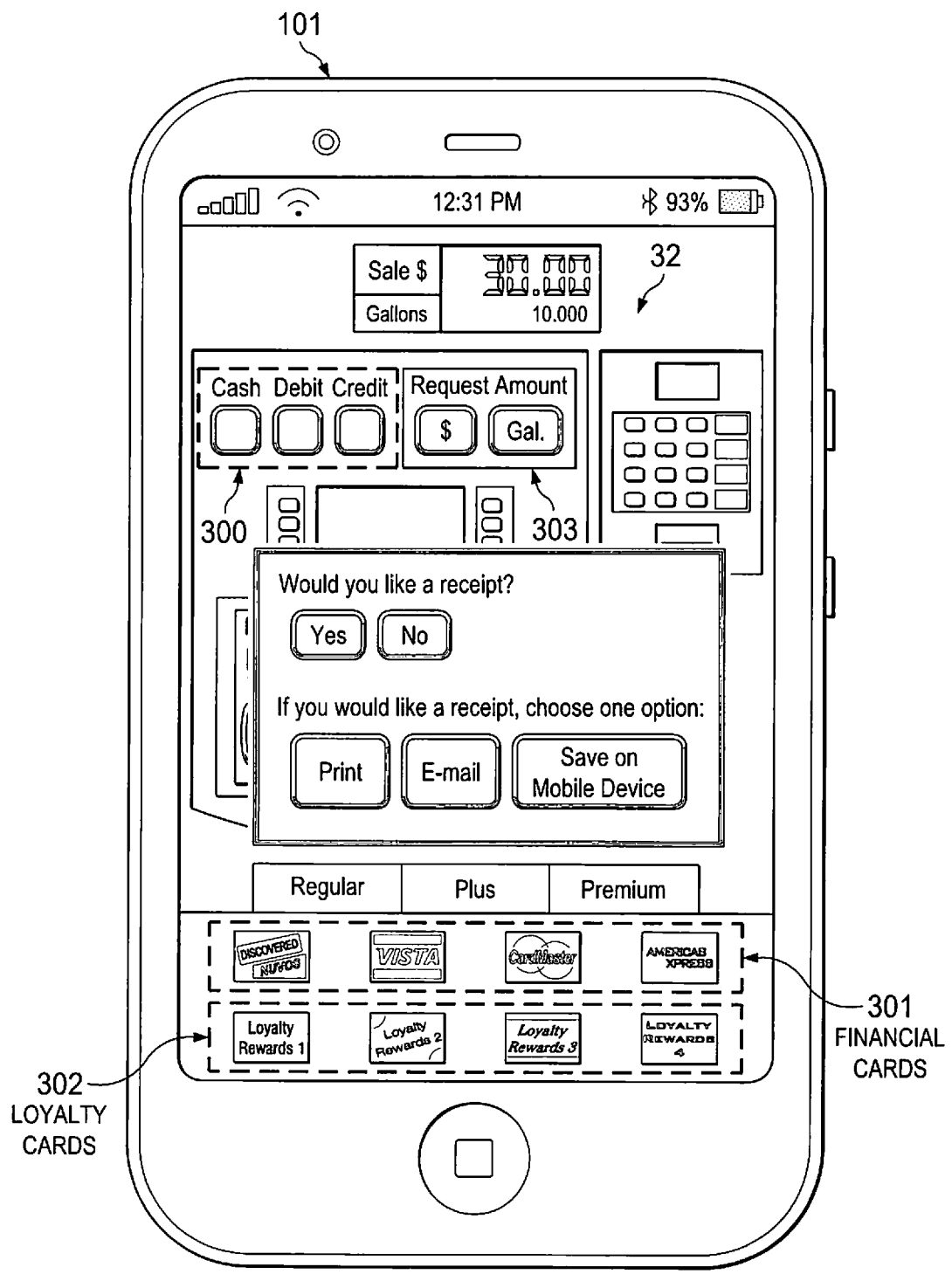

At block 214, fuel pump 104 asks whether consumer 103 would like a receipt. This question may also appear on the emulation on mobile device 101, as shown in GUI 34 (FIG. 3K). Because, as noted above, any of the interactions between consumer 103 and mobile device 101 may be carried out using other means such as voice, mobile device 101 may communicate the question by voice from a speaker of mobile device 101 or a speaker communicatively connected to mobile device 101. Consumer 103 may select "yes" or "no" via an input feature such as the touch screen. Alternatively, consumer 103 could say a response "yes" or "no," which could be received by a microphone of mobile device 101 or a microphone communicatively connected to mobile device 101. Further, consumer 103 may be provided, by processor 100-P or 101-P, with an option to get an electronic receipt, which may be saved on mobile device 101 or sent to a remote data base (e.g. at memory 100-M) or to an e-mail address, based on a response from consumer 103.

In embodiments of the invention, mobile device 101 may be adapted to not track the miles per gallon and to track the cost per gallon to operate vehicle 106, since mobile device 101 may receive fuel cost information for various fuel transactions, over time, based on the emulation of various fuel pumps.

In embodiments of the invention, processor 100-P (computer system 100) may be located in fuel pump 104. In such a scenario, the operations described herein that involves communication between processor 100-P and fuel pump 104 would involve communications between different components of fuel pump 104 (e.g. communication between different processors of fuel pump 104). And, in such a scenario, communications between fuel pump 104 and mobile device 101 would essentially be direct communications between these devices. In embodiments of the invention, fuel pump 104 may have only one processor for carrying out the functions described above that fuel pump 104 and processor 100-P preforms. In such a case, the communications between processor 100-P and fuel pump 104 would be eliminated and the fuel pump 104 would communicate with mobile device 101 directly.

Figure 4:
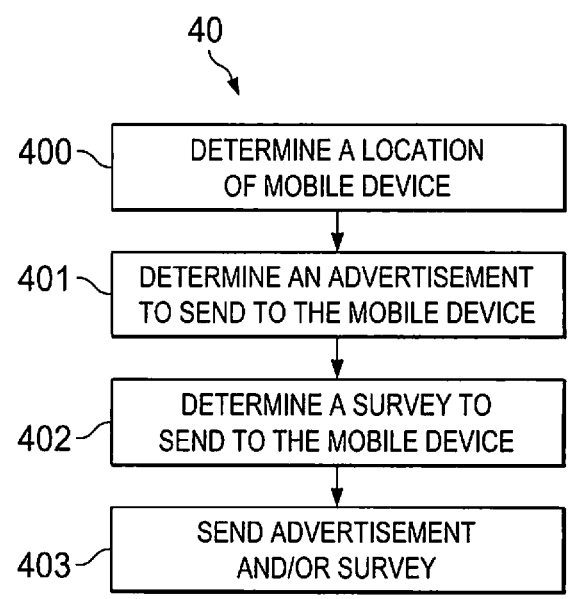
FIG. 4 is a process for marketing on a mobile device, according to embodiments of the invention.

FIG. 4 shows process 40, in which, during a fueling transaction that is controlled from an emulation of a fuel pump on a mobile device, advertisements are sent to the mobile device. Block 400 involves determining a location of mobile device 101. This determination may take place from the process described above with respect to blocks 200 and 201. For example, processor 100-P may determine the location of the mobile device based on mobile device 101 transmitting information to computer system 100. The information may be transmitted in response to consumer 103 providing instructions to mobile device 101 or mobile device 101 makes the transmission automatically as described above with respect to process 20. The information transmitted as a result of instructions from consumer 103 may be location information or identification information of the service station or fuel pump, or both, at which consumer 103 desires to carry out a fuel transaction. This transmitted information may include a QR code, an identification number, an address, and combinations thereof. As an addition to, or as an alternative to, consumer 103 transmitting information, processor 100-P may identify the service station, fuel pump, or both, based on the receipt of global positioning system information that establishes mobile device 101 is at the service station or at a particular pump.

As noted above, mobile device 101 may be the communication system of vehicle 106 or vehicle 106. Because the vehicle communication system may have access to information such as the service data pertaining to a vehicle, the number of persons present in vehicle 106, the location of vehicle 106 (e.g. from a vehicle navigation system), the planned route of vehicle 106 (e.g. from a vehicle navigation system) etc., mobile device 101 may be able to provide a variety of functionalities based on this information. It should be noted, however, that the other mobile devices such as smart phone and computer may also be adapted to provide these functionalities. For example, a smart phone or computer may be able to run a navigation application to determine location and planned route. Further, the smart phone or computer may also be communicatively connected to the communication system of vehicle 106 to provide some of the functionalities (e.g. functionalities that may require access to service data). These functionalities may include advertising, sending promotional information etc.

At block 401, processor 100-P determines an advertisement to send to mobile device 101-P. The process involved at block 401 may involve the use of logic that takes into account the identity of the consumer (based, for example, on the identification information of mobile device 101), motor vehicle data, location of mobile device 101, a loyalty program etc. and combinations thereof. The motor vehicle data may be (service data) (e.g. data that informs about the condition of vehicle 106) or data about how vehicle 106 is being used.

The service data, for example, may include information that vehicle 106 needs a lubricant change. How vehicle 106 is being used may involve information that three persons are in vehicle 106, which is based on, for example, three seat belts being engaged. In the modern car, which often has intelligent software, this type of service and operational information is electronically available. As such, embodiments of the invention make use of this information to provide dynamic advertising on a mobile device (such as a vehicle or the communication system of the vehicle). For instance, the mobile device may use service data that indicate a need for a lubricant change to determine to advertise lubricants or an oil change promotion that is available at a location that is close to a current location of the mobile device. Mobile device 103 may use information that three persons are in vehicle 106 to determine that consumer 103 should be informed of a promotion, in which, if the consumer buys two hot dogs, the consumer gets one free. In essence, mobile device 101 provides dynamic advertisements to consumer 103 based on existing circumstances. The advertisement may be via the screen 101-S (visual communication) or via a speaker (vocal) of mobile device 101 or a speaker communicatively connected to mobile device 101.

As a further example, mobile device 101 (e.g. a vehicle or the vehicle's communication system) may provide notifications regarding a loyalty program. For example, consumer 103 may be driving vehicle 106 along a road when processor 101-P determines that vehicle 106 needs refueling of a certain amount, that consumer 103 has rewards for a loyalty program that will expire that day, and, based on the location of vehicle 106 (determined based on GPS of vehicle 106's navigation system), that there is a nearby service station where refueling can be carried out to use the rewards before they expire. Here, mobile device 101 is using vehicle data (amount of fuel in tank), data regarding a loyalty program (rewards about to expire) and location data to determine a notification to provide to consumer 103. Mobile device 101 may have access to information regarding promotions at various locations from the Internet or other network. This information may be sent to mobile device 101 or mobile device 101 may search the Internet or other network for this information. In embodiments of the invention, mobile device 101 may have a shopping list of items that consumer 103 wishes to purchase. Based on location information from the navigation system of mobile device 101 and information received about marketing programs, mobile device 101 may communicate (e.g. by voice) to consumer 103 that a particular supermarket just ahead on vehicle 106's route is having a promotion on one or more items on the shopping list.

At block 402, processor 100-P may determine a survey to send to mobile device 101-P. The process involved at block 402 may involve the use of logic that takes into account the identity of consumer 103 (based, for example, on the identity of mobile device 101), motor vehicle data, location of mobile device 101, a loyalty program and combinations thereof. The communications regarding the survey may be via the screen 101-S or via a speaker of mobile device 101 or a speaker communicatively connected to mobile device 101.

Block 403 involves processor 100-P sending the advertisement determined at block 401 or the survey determined at block 402, or both, to mobile device 101. In embodiments, advertisements and surveys are sent to mobile device 101 when consumer 103 is a captive audience as a result of the operation of mobile device 101 to control fuel pump 104 during a fuel transaction. In embodiments, especially when the mobile device is a vehicle or the communication system of the vehicle, and the vehicle is moving, the advertisements and communications may be presented verbally via a speaker because of safety concerns with reading and interacting with a screen while the vehicle is moving.

Although embodiments of the present invention have been described with reference to the steps of FIGS. 2 and 4, it should be appreciated that operation of the present invention is not limited to the particular steps, the particular order, or both, of the steps illustrated in FIGS. 2 and 4. Accordingly, embodiments of the invention may provide functionality as described herein using various steps in a sequence different than that of FIGS. 2 and 4.

Many of the elements described herein, when implemented via computer-executable instructions, are in essence the software code defining the operations thereof. For instance, mobile device 101 and computer system 100 of FIG. 1 may each comprise computer-executable software code that is stored to a computer-readable storage medium and is executed by a processor for performing the corresponding operations described herein. Further, the various operations described herein, such as those operations described with reference to the exemplary flow of FIGS. 2 and 4, as well as other operations described herein for performing emulation of a fuel pump and advertising, may be performed by computer-executable software code stored to a computer-readable storage medium and executing on a processor-based computing device. The executable instructions or software code may be obtained, for example, from a computer-readable storage medium or "storage device" (e.g., a hard drive media, optical media, EPROM, EEPROM, tape media, cartridge media, flash memory, ROM, memory stick, and/or the like), and may be executed by a processor-based device, such as mobile device 101 and/or computer system 100, for performing the operations described herein.

According to embodiments of the present invention, the software instructions/routines are implemented as a computer program product that can be installed to a processor-based device (e.g., mobile device 101, fuel pump 104, and/or computer system 100) by any suitable software installation procedure, as is well known in the art. In another embodiment, at least a portion of the software instructions may also be downloaded via a communication network (e.g., network 102) over a cable, communication and/or wireless connection.

All or a portion of the software instructions and/or data may be communicated (e.g., across network 102 and/or within a given computer device) as signals propagating on a carrier or propagation medium. As used herein, a "computer-readable storage medium" refers to a tangible storage medium, such as a hard disk, ROM, RAM, flash memory device, magnetic memory device, and is not intended to refer merely to a propagating signal.

According to one exemplary implementation of an embodiment of the present invention, a mobile software application (or "mobile app") is implemented on a user's mobile device (e.g., smartphone) and functions to make it more convenient for a consumer conduct a fuel transaction by emulating the fuel pump interface on such mobile (e.g., "hand-held") device. With use of this exemplary application, in a few "clicks" or "taps" (e.g., mouse clicks or finger touches to a touch-screen) the consumer can carry out functions that would normally have to be done while at the pump. The mobile application may be installed to a processor-based device (e.g., a mobile device, such as mobile device 101 of FIG. 1) by any suitable software installation procedure, as is well known in the art, such as via a download over a communication network (e.g., network 102) from an application store available on a computer server.

Figure 5:
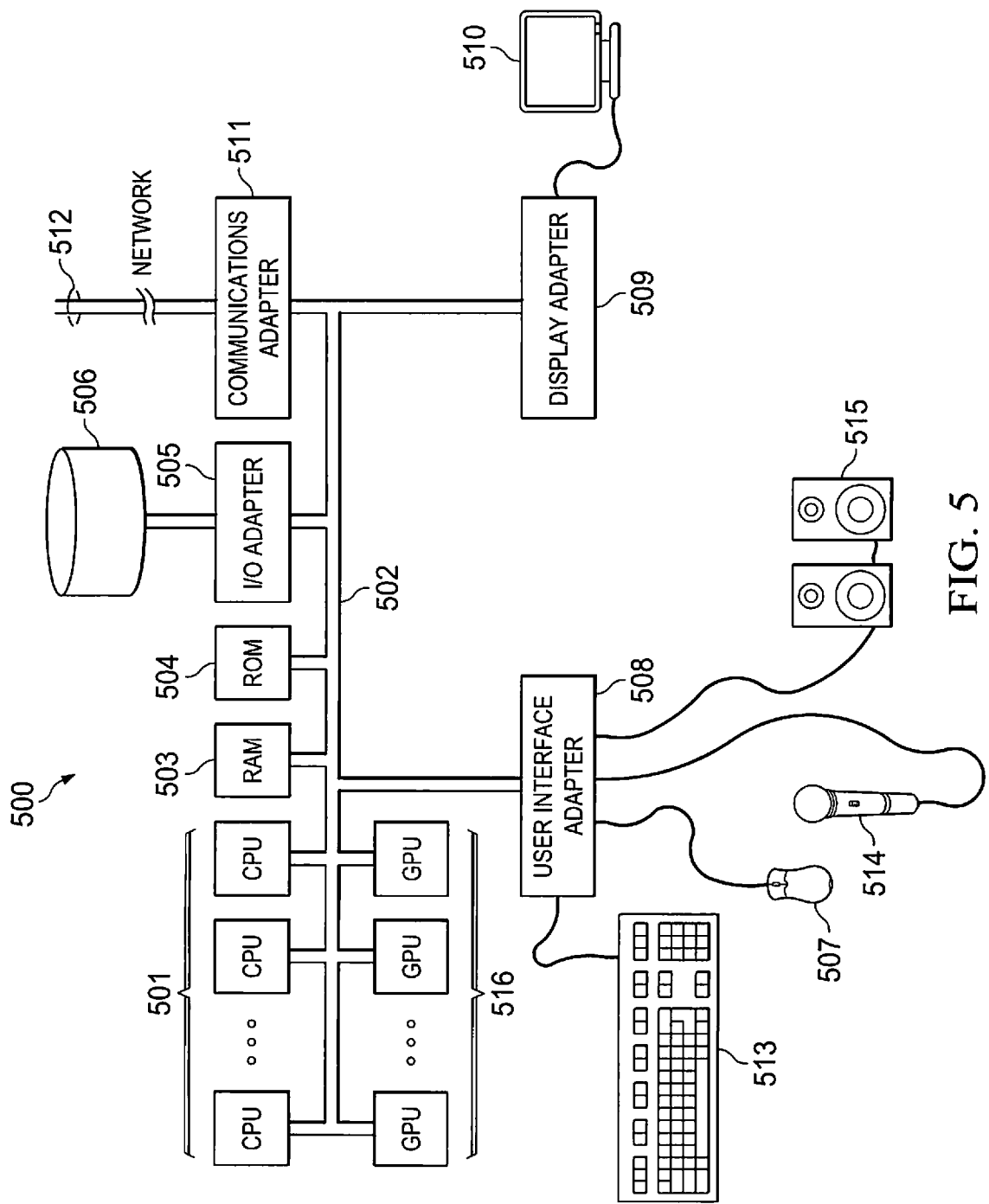
FIG. 5 is a system for emulating a fuel pump on a mobile device and marketing on a mobile device, according to embodiments of the invention.

FIG. 5 illustrates an exemplary computer system 500 which may be employed to implement the system for emulating a fuel pump and marketing on a mobile device according to certain embodiments. Central processing unit ("CPU" or "processor") 501 is coupled to system bus 502. CPU 501 may be any general-purpose processor. The present disclosure is not restricted by the architecture of CPU 501 (or other components of exemplary computer system 500) as long as CPU 501 (and other components of computer system 500) supports the inventive operations as described herein. As such CPU 501 may provide processing to computer system 500 through one or more processors or processor cores. CPU 501 may execute the various logical instructions described herein. For example, CPU 501 may execute machine-level instructions according to the exemplary operational flow described above in conjunction with FIGS. 2 and 4. When executing instructions representative of the operational steps illustrated in FIGS. 2 and 4, CPU 501 becomes a special-purpose processor of a special purpose computing platform configured specifically to operate according to the various embodiments of the teachings described herein.

Computer system 500 also includes random access memory (RAM) 503, which may be SRAM, DRAM, SDRAM, or the like. computer system 500 includes read-only memory (ROM) 504 which may be PROM, EPROM, EEPROM, or the like. RAM 503 and ROM 504 hold user and system data and programs, as is well known in the art.

Computer system 500 also includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information.

I/O adapter 505 connects to storage device(s) 506, such as one or more of hard drive, compact disc (CD) drive, floppy disk drive, tape drive, etc., to computer system 500. The storage devices are utilized in addition to RAM 503 for the memory requirements associated with emulating a fuel pump and marketing on a mobile device. Communications adapter 511 is adapted to couple computer system 500 to network 512, which may enable information to be input to and/or output from computer system 500 via such network 512, (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to computer system 500. Display adapter 509 is driven by CPU 501 or by graphical processing unit (GPU) 516 to control the display on display device 510 to, for example, emulate a fuel pump and marketing on a mobile device. GPU 516 may be any various number of processors dedicated to graphics processing and, as illustrated, may be made up of one or more individual graphical processors. GPU 516 processes the graphical instructions and transmits those instructions to display adapter 509. Display adapter 509 further transmits those instructions for transforming or manipulating the state of the various numbers of pixels used by display device 510 to visually present the desired information to a user. Such instructions include instructions for changing state from on to off, setting a particular color, intensity, duration, or the like. Each such instruction makes up the rendering instructions that control how and what is displayed on display device 510.

It shall be appreciated that the present disclosure is not limited to the architecture of computer system 500. For example, any suitable processor-based device may be utilized for implementing the system for emulating a fuel pump and marketing on a mobile device including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for emulating a fuel transaction at a mobile device, said method comprising:
 presenting a graphical user interface at a display of said mobile device, wherein the graphical user interface is configured to emulate a fuel pump;
 establishing, by said mobile device, a communication link between said mobile device and the fuel pump;
 presenting, by said mobile device within said graphical user interface, graphical user interface elements configured to control operation of said fuel pump as a part of emulation of said fuel pump, wherein said graphical user interface elements are configured to present a real-time imitation of the fuel pump on said graphical user interface, and wherein said graphical user interface elements comprise:
- a fuel icon for selecting a preset amount of fuel to be purchased,
- a display region configured to display emulation data received from said fuel pump during a fueling transaction via the communication link between the mobile device and the fuel pump,
- a fuel pump activation icon configured to cause said fuel pump to start pumping fuel or stop pumping fuel,
- two or more payment method icons representing different payment methods available at the fuel pump,
- two or more loyalty reward program icons representing different loyalty rewards programs, and
- a card reader icon representing a card reader of the fuel pump;

receiving, by said mobile device, inputs via the graphical user interface associated with a selection of one of the payment methods and another selection of one of the loyalty reward programs, wherein the inputs are received by dragging and dropping, to the card reader icon representing the card reader on said display of said mobile device, one of the payment method icons and one of the loyalty reward program icons;

transmitting, by said mobile device, payment information that identifies the selected one of the payment methods and the selected one of the loyalty rewards programs to said fuel pump, wherein said fuel pump is activated in response to receiving said payment information;

receiving, from said fuel pump, emulation data at said mobile device of a user;

receiving, by said mobile device, information regarding a flow rate indicating a rate at which fuel is dispensed by said fuel pump during a fuel transaction initiated in response to the transmitting the payment information;

calculating, by said mobile device, a real-time volume of fuel dispensed during said fuel transaction based on said flow rate and an amount of time elapsed since dispensing of fuel began; and displaying, by said mobile device, information associated with said fuel transaction at said display region of said graphical user interface, wherein said information associated with said fuel transaction comprises the real-time volume of fuel dispensed during said fuel transaction, and wherein said real-time volume of fuel dispensed, as displayed in said graphical user interface, is dynamically updated as a function of the flow rate and the amount of time elapsed since dispensing of fuel began such that the amount of fuel dispensed, as displayed at the graphical user interface, corresponds to an actual amount of fuel dispensed by said fuel pump as said fueling transaction occurs.

2. The method of claim 1, wherein said communication link communicatively couples a computer system to said fuel pump and to said mobile device via a network.

3. The method of claim 2, wherein said graphical user interface further comprises:
- a display of different grades of gasoline;
- a price of each of said different grades of gasoline;
- one or more icons adapted to allow selection of a type or grade of fuel; and
- a display of an amount of fuel purchased.

4. The method of claim 2, wherein said mobile device is configured to establish communication links to a plurality of fuel pumps at a plurality of fuel stations that are remote from said fuel pump to facilitate payment and loyalty rewards processing.

5. The method of claim 1, further comprising:
receiving information that identifies said fuel pump as a particular fuel pump distinguished from other fuel pumps at a same fueling location.

6. The method of claim 5, wherein said information received that identifies said fuel pump is sent by said user from said mobile device.

7. The method of claim 5, wherein said receiving information that identifies said fuel pump occurs automatically.

8. The method of claim 7, wherein said receiving information that identifies said fuel pump automatically occurs when said mobile device is at a predetermined proximity from said fuel pump.

9. The method of claim 8, wherein said receiving information that identifies said fuel pump automatically comprises a Wi Fi or a Bluetooth communication.

10. The method of claim 5, wherein said information is a selection from the list consisting of: a QR code, a barcode, an identification number, an address, and combinations thereof.

11. The method of claim 1 further comprising:
identifying said fuel pump based on a location of said mobile device.

12. The method of claim 11 further comprising:
receiving, from said user, an indication of a desire for said fuel transaction.

13. The method of claim 1, wherein said information received by said at least one processor is selected from the list consisting of: a selection of a grade of fuel, a selection of an amount of fuel, an indication of a payment method, and a selection of a card for payment and combinations thereof.

14. The method of claim 1, wherein said at least one step for said transaction comprises:
requesting, by said at least one processor, credit or debit authorization for said transaction.

15. The method of claim 1, wherein said at least one step for said transaction comprises:
sending an instruction to said pump to perform at least one operation selected from the list consisting of: pump fuel, implement a selection of a type or grade of fuel, implement a selection of an amount of fuel to be purchased, and stop pumping fuel.

16. The method of claim 1, wherein said obtaining comprises creating said emulation data regarding said fuel pump from information received by said at least one processor regarding said fuel pump.

17. The method of claim 1, wherein said obtaining comprises receiving said emulation data regarding said fuel pump from a remote source.

18. The method of claim 1, further comprising:
receiving information from said mobile device regarding a non-fuel transaction.

19. The method of claim 18, wherein said information regarding said non-fuel transaction comprises an order for a non-fuel product.

20. The method of claim 19, further comprising:
receiving payment information for said non-fuel product.

21. The method of claim 19, further comprising:
sending, to said mobile device, data regarding said non-fuel transaction.

22. The method of claim 21, wherein said data regarding said non-fuel transaction comprises cost data, data about different types of said non-fuel product, a receipt for purchasing said non-fuel product, and combinations thereof.

23. The method of claim 18, further comprising:
sending, to said mobile device, an advertisement regarding a non-fuel product, wherein said sending said advertisement occurs prior to receiving information from said mobile device regarding said non-fuel transaction.

24. The method of claim 1 further comprising:
determining, by said at least one processor, an advertisement to be sent to said mobile device; and
sending said advertisement to said mobile device.

25. The method of claim 24, wherein said determining comprises using information selected from the list consisting of: identity of said user, motor vehicle data, location of said mobile device, a loyalty program and combinations thereof.

26. The method of claim 1 further comprising:
determining, by said at least one processor, a survey to be sent to said mobile device; and
sending said survey to said mobile device.

27. The method of claim 26, wherein said determining comprises using information selected from the list consisting of: identity of said user, motor vehicle data, location of said mobile device, information about a loyalty program and combinations thereof.

28. The method of claim 1 further comprising:
determining which of a plurality of payment methods is most cost effective for said user; and
sending information to said mobile device regarding a payment method as being most cost effective.

29. The method of claim 1, wherein the mobile device is selected from the list consisting of: a telephone, a tablet, a computer, a vehicle, and a communication system of a vehicle.

30. A system comprising:
a fuel pump that includes a first memory and at least one first processor coupled to said first memory;
a mobile device that includes a second memory and at least one second processor coupled to said second memory,
wherein said at least one second processor is configured to present:
a graphical user interface at a display of said mobile device, wherein the graphical user interface is configured to emulate a fuel pump;
establish a communication link between said mobile device and the fuel pump;
present, within said graphical user interface, graphical user interface elements configured to control operation of said fuel pump as a part of emulation of said fuel pump, wherein said graphical user interface elements are configured to present a real-time imitation of the fuel pump on said graphical user interface, and wherein said graphical user interface elements comprise:
a fuel icon for selecting a preset amount of fuel to be purchased,
a display region configured to display emulation data received from said fuel pump during a fueling transaction via the communication link between the mobile device and the fuel pump,
a fuel pump activation icon, wherein initiation of said fuel pump activation icon is configured to cause said fuel pump to start pumping fuel or stop pumping fuel, two or more payment method icons representing different payment methods available at the fuel pump,
two or more loyalty reward program icons representing different loyalty rewards programs, and
a card reader icon representing a card reader of the fuel pump;
receive inputs via the graphical user interface associated with a selection of one of the payment methods and another selection of one of the loyalty reward programs, wherein the inputs are received by dragging and dropping, to the card reader icon representing the card reader on said display of said mobile device, one of the payment method icons and one of the loyalty reward program icons;
transmit payment information that identifies the selected one of the payment methods and the selected one of the loyalty rewards programs to said fuel pump, wherein said fuel pump is activated in response to receiving said payment information;
wherein said at least one first processor is configured to:
initiate a fuel transaction in response to receiving said activation, wherein the fueling transaction dispenses fuel from the fuel pump;
send emulation data to said mobile device in real-time;
wherein said at least one second processor is configured to:
receive information regarding a flow rate indicating a rate at which fuel is dispensed by said fuel pump during said fuel transaction initiated in response to transmission of the payment information;
calculate a real-time volume of fuel dispensed during said fuel transaction based on said flow rate and an amount of time elapsed since dispensing of fuel began; and
display information associated with said fuel transaction at said display region of said graphical user interface, wherein said information associated with said fuel transaction comprises the real-time volume of fuel dispensed during said fuel transaction, and wherein said real-time volume of fuel dispensed, as displayed in said graphical user interface, is dynamically updated as a function of the flow rate and the amount of time elapsed since dispensing of fuel began such that the amount of fuel dispensed, as displayed at the graphical user interface, corresponds to an actual amount of fuel dispensed by said fuel pump as said fueling transaction occurs.

31. The system of claim 30, wherein said graphical user interface emulates said fuel pump.

32. The system of claim 31, wherein said graphical user interface comprises:
a display of different grades of gasoline;
a price of each of said different grades of gasoline;
one or more icons adapted to allow selection of a type or grade of fuel; and
a display of an amount of fuel purchased.

33. The system of claim 30, wherein said at least one processor is further adapted to:
receive information that identifies said fuel pump as a particular fuel pump distinguished from other fuel pumps at a same fueling location.

34. The system of claim 33, wherein information received that identifies said fuel pump is sent by said user from said mobile device.

35. The system of claim 33, wherein information received that identifies said fuel pump is sent automatically from said mobile device.

36. The system of claim 35, wherein said information received that identifies said fuel pump is sent automatically by said mobile device when said mobile device is at a predetermined proximity from said fuel pump.

37. The system of claim 35, wherein said received information that identifies said fuel pump automatically is received via a Wi Fi or a Bluetooth communication.

38. The system of claim 33, wherein said information is a selection from the list consisting of: a QR code, a barcode, an identification number, an address, and combinations thereof.

39. The system of claim 30, wherein said at least one processor is further adapted to:
identify said fuel pump based on a location of said mobile device.

40. The system of claim 39, wherein said at least one processor is further adapted to:
receive, from said user, an indication of a desire for said fuel transaction.

41. The system of claim 30, wherein said information regarding said fuel transaction is selected from the list consisting of: a selection of a grade of fuel, a selection of an amount of fuel, an indication of a payment method, and a selection of a card for payment.

42. The system of claim 30, wherein said at least one processor is further adapted to:
request verifying information regarding any of the list consisting of: a credit card, a debit, a gift card and a prepaid card.

43. The system of claim 30 wherein said at least one processor is further adapted to:
send an instruction to said pump to perform at least one operation selected from the list consisting of: pump fuel, implement a selection of a type or grade of fuel, implement a selection of an amount of fuel to be purchased, and stop pumping fuel.

44. The system of claim 30, wherein said at least one processor is further adapted to:
create said emulation data of said fuel pump from information received by said at least one processor regarding said fuel pump.

45. The system of claim 30, wherein said at least one processor is further adapted to:
receive said emulation data of said fuel pump from a remote source.

46. The system of claim 30, wherein said at least one processor is further adapted to:
receive information from said mobile device regarding a non-fuel transaction.

47. The system of claim 46, wherein said information regarding said non-fuel transaction comprises an order for a non-fuel product.

48. The system of claim 47, wherein said at least one processor is further adapted to:
receive payment information for said non-fuel product.

49. The system of claim 47, wherein said at least one processor is further adapted to:
send, to said mobile device, data regarding said non-fuel transaction.

50. The system of claim 49, wherein said data regarding said non-fuel transaction comprises data about different types of said non-fuel product, a receipt for purchasing said non-fuel product, and combinations thereof.

51. The system of claim 30, wherein said at least one processor is further adapted to:
send, to said mobile device, an advertisement regarding a non-fuel product, wherein said advertisement is sent prior to receiving information from said mobile device regarding said non-fuel transaction.

52. The system of claim 30, wherein said at least one processor is further adapted to:
determine an advertisement to be sent to said mobile device; and
sending said advertisement to said mobile device.

53. The system of claim 52, wherein said at least one processor is adapted to:
determine said advertisement using information selected from the list consisting of:
identity of said user, motor vehicle data, location of said mobile device, a loyalty program and combinations thereof.

54. The system of claim 30 wherein said at least one processor is further adapted to:
determine a survey to be sent to said mobile device; and
send said survey to said mobile device.

55. The system of claim 54, wherein said at least one processor is further adapted to:
determine said survey using information selected from the list consisting of: identity of said user, motor vehicle data, location of said mobile device, a loyalty program and combinations thereof.

56. The system of claim 30, wherein said at least one processor is further adapted to:
determine which of a plurality of payment methods is most cost effective for said user; and
present information to said user identifying a payment method as being most cost effective.

57. The system of claim 30, wherein the mobile device is selected from the list consisting of: a telephone, a tablet, a computer, a vehicle, and a communication system of a vehicle.

58. A mobile device comprising:
a display;
a memory; and
at least one processor adapted to:
present a graphical user interface at the display of the mobile device, wherein the graphical user interface is configured to emulate a fuel pump;
establish a communication link between the mobile device and the fuel pump;
present, within said graphical user interface, graphical user interface elements configured to control operation of said fuel pump as a part of emulation of said fuel pump, wherein said graphical user interface elements are configured to present a real-time imitation of the fuel pump on said graphical user interface, and wherein said graphical user interface elements comprise:
a fuel icon for selecting a preset amount of fuel to be purchased,
a display region configured to display emulation data received from said fuel pump during a fueling transaction via the communication link between the mobile device and the fuel pump,
a fuel pump activation icon, wherein initiation of said fuel pump activation icon is configured to cause said fuel pump to start pumping fuel or stop pumping fuel,
two or more payment method icons representing different payment methods available at the fuel pump, and
two or more loyalty reward program icons representing different loyalty rewards programs, and
a card reader icon representing a card reader of the fuel pump;

receive inputs via the graphical user interface associated with a selection of one of the payment methods and another selection of one of the loyalty reward programs, wherein the inputs are received by dragging and dropping, to the card reader icon representing the card reader on said display of said mobile device, one of the payment method icons and one of the loyalty reward program icons;

transmit payment information that identifies the selected one of the payment methods and the selected one of the loyalty rewards programs to said fuel pump, wherein said fuel pump is activated in response to receiving said payment information;

receive first emulation data upon initiating dispensing of fuel during a fueling transaction initiated subsequent to activation of said fuel pump, wherein said first emulation data comprises first fuel data corresponding to a first amount of fuel that has been dispensed during a first portion of the fueling transaction;

display the first emulation data at the display region of the graphical user interface;

subsequent to receiving the first emulation data, receive second emulation data in real-time upon initiating dispensing of fuel during a fueling transaction initiated subsequent to activation of said fuel pump, wherein said second emulation data comprises second fuel data corresponding to a second amount of fuel that has been dispensed during a second portion of the fueling transaction;

update the display region to display the second emulation data;

receive additional emulation data as additional amounts of fuel are dispensed until the fueling transaction is complete, each additional piece of emulation data indicating an updated amount of fuel that has been dispensed during a time period subsequent to a previous transmission of emulation data, and wherein the first emulation data, the second emulation data, and the additional emulation data are received in real-time as the fueling transaction takes place; and update the display region to display current emulation data indicating an amount of fuel that has been dispensed based on each piece of additional emulation data is received, wherein a last piece of emulation data indicates a total amount of fuel dispensed during the fueling transaction.

59. The mobile device of claim 58, wherein said graphical user interface is further adapted to present corresponding information of information that is displayed at said fuel pump wherein changes in said information displayed at said fuel pump causes changes, during a fuel transaction, to said corresponding information presented on said graphical user interface.

60. The mobile device of claim 59, wherein said information displayed at said fuel pump is selected from the list consisting of: a volume of fuel purchased, a value of fuel purchased, prompts on said fuel pump pertaining to said fuel transaction, information on said fuel pump pertaining to said fuel transaction, information on said fuel pump unrelated to said fuel transaction, and combinations thereof.

61. The mobile device of claim 60, wherein said at least one processor is adapted to calculate said volume of fuel purchased and said value of fuel purchased.

62. The mobile device of claim 60, wherein said at least one processor receives information regarding said volume of fuel purchased and said value of fuel purchased.

63. The mobile device of claim 58, wherein said at least one processor is further adapted to:
determine which of a plurality of loyalty cards is most beneficial for use in a particular fuel transaction.

64. The mobile device of claim 58, wherein said at least one processor is further adapted to:
determine which of a plurality of financial cards is most beneficial for use in a particular fuel transaction.

65. The mobile device of claim 58, wherein said graphical user interface comprises:
a presentation of different grades of fuel;
a price of each of said different grades of fuel;
icons for said user to make a selection of a type or grade of fuel; and
a display of an amount of fuel purchased.

66. The mobile device of claim 58, wherein said mobile device is selected from a list consisting of: a telephone, a tablet, a computer, a vehicle, and a communication system of a vehicle.

67. A non-transitory computer-readable medium storing instructions that, when executed by one or more processors, cause the one or more processors to perform operations for emulating a fuel pump, the operations comprising:
displaying a graphical user interface at a display of a mobile device, wherein the graphical user interface is configured to emulate the fuel pump;
establishing a communication link between the mobile device and the fuel pump;
presenting, within said graphical user interface, graphical user interface elements configured to control operation of said fuel pump as a part of emulation of said fuel pump, wherein said graphical user interface elements are configured to present a real-time imitation of the fuel pump on said graphical user interface, and wherein said graphical user interface elements comprise:
a fuel icon for selecting a preset amount of fuel to be purchased,
a display region configured to display emulation data received from said fuel pump during a fueling transaction via the communication link between the mobile device and the fuel pump,
a fuel pump activation icon, wherein initiation of said fuel pump activation icon is configured to cause said fuel pump to start pumping fuel or stop pumping fuel,
two or more payment method icons representing different payment methods available at the fuel pump, and
two or more loyalty reward program icons representing different loyalty rewards programs, and
a card reader icon representing a card reader of the fuel pump;
receiving inputs via the graphical user interface associated with a selection of one of the payment methods and another selection of one of the loyalty reward programs, wherein the inputs are received by dragging and dropping, to the card reader icon representing the card reader on said display of said mobile device, one of the payment method icons and one of the loyalty reward program icons;
transmitting payment information that identifies the selected one of the payment methods and the selected one of the loyalty rewards programs to said fuel pump, wherein said fuel pump is activated in response to receiving said payment information;

receiving first emulation data upon initiating dispensing of fuel during a fueling transaction initiated subsequent to activation of said fuel pump, wherein said first emulation data comprises first fuel data corresponding to a first amount of fuel that has been dispensed during a first portion of the fueling transaction;

displaying the first emulation data at the display region of the graphical user interface;

subsequent to receiving the first emulation data, receiving second emulation data in real-time upon initiating dispensing of fuel during a fueling transaction initiated subsequent to activation of said fuel pump, wherein said second emulation data comprises second fuel data corresponding to a second amount of fuel that has been dispensed during a second portion of the fueling transaction;

updating the display region to display the second emulation data;

receiving additional emulation data as additional amounts of fuel are dispensed until the fueling transaction is complete, each additional piece of emulation data indicating an updated amount of fuel that has been dispensed during a time period subsequent to a previous transmission of emulation data, and wherein the first emulation data, the second emulation data, and the additional emulation data are received in real-time as the fueling transaction takes place; and updating the display region to display current emulation data indicating an amount of fuel that has been dispensed based on each piece of additional emulation data is received, wherein a last piece of emulation data indicates a total amount of fuel dispensed during the fueling transaction.

68. The non-transitory computer-readable medium of claim 67, wherein said graphical user interface is further adapted to present corresponding information of information that is displayed at said fuel pump, wherein changes in said information displayed at said fuel pump causes changes, during a fuel transaction, to said corresponding information presented on said graphical user interface.

69. The non-transitory computer-readable medium of claim 68, wherein said information displayed at said fuel pump is selected from the list consisting of: a volume of fuel purchased, and a value of fuel purchased.

70. The non-transitory computer-readable medium of claim 69, the operations further comprising receiving information regarding said volume of fuel purchased and said value of fuel purchased.

71. The non-transitory computer-readable medium of claim 69, the operations further comprising calculating said volume of fuel purchased and said value of fuel purchased.

72. The non-transitory computer-readable medium of claim 67, the operations further comprising:
  determine which of a plurality of loyalty cards is most beneficial for use in a particular fuel transaction.

73. The non-transitory computer-readable medium of claim 67, the operations further comprising:
  determine which of a plurality of financial cards is most beneficial for use in a particular fuel transaction.

74. The non-transitory computer-readable medium of claim 67, wherein said graphical user interface comprises:
  a presentation of different grades of fuel;
  a price of each of said different grades of fuel;
  icons for said user to make a selection of a type or grade of fuel; and
  a display of an amount of fuel purchased.

* * * * *